United States Patent
Kataoka et al.

[11] Patent Number: 6,040,760
[45] Date of Patent: Mar. 21, 2000

[54] CENTER CLUSTER MODULE AND SYSTEM, AND ELECTRICAL EQUIPMENT CONNECTOR SYSTEM

[75] Inventors: Ichiro Kataoka; Kunimitsu Aoki; Yoshiyuki Furuya; Junichi Matsushita; Hiroshi Nishiyama; Katsutoshi Nakajima; Akira Norizuki; Katsumi Murakami; Takeyuki Amari, all of Numazu, Japan

[73] Assignee: Yazaki Corporation, Tokyo, Japan

[21] Appl. No.: 09/066,774

[22] Filed: Apr. 27, 1998

[30] Foreign Application Priority Data

Apr. 28, 1997 [JP] Japan ................................. P9-111502
Apr. 2, 1998 [JP] Japan ................................ P10-090240

[51] Int. Cl.$^7$ ..................................................... B60Q 1/00
[52] U.S. Cl. ..................... 340/425.5; 340/426; 307/10.2; 307/10.5
[58] Field of Search ............................... 340/425.5, 426; 307/10.2, 10.3, 10.5; 180/287

[56] References Cited

U.S. PATENT DOCUMENTS 5,633,624  5/1997  Maeda et al. ............................ 340/426

FOREIGN PATENT DOCUMENTS 8-65331   3/1996  Japan .
8-265319  10/1996  Japan .
8-307321  11/1996  Japan .

*Primary Examiner*—Daryl Pope
*Attorney, Agent, or Firm*—Olbon, Spivak, McClelland, Maier & Neustadt, P.C.

[57] ABSTRACT

Multiple pieces of equipment installed in a vehicle are freely installed and removed to equipment connection slots. A bus line interconnects the multiple pieces of electrical equipment installed in the equipment connection slots. Multiple operating switches arranged in a single unit on an operating section are provided in correspondence to the multiple pieces of electrical equipment for producing control signals to control each of the multiple pieces of electrical equipment. When any one of the operating switches is manipulated, a head unit controls, via the bus line, the electrical equipment corresponding to the manipulated operating switch.

19 Claims, 28 Drawing Sheets

CENTER CLUSTER MODULE AND SYSTEM, AND ELECTRICAL EQUIPMENT CONNECTOR SYSTEM

BACKGROUND OF THE INVENTION

1. Field of the Invention

The present invention relates to a center cluster module and system, and an electrical equipment connector system for facilitating installations in automobiles and other vehicles and for reducing costs.

2. Description of the Related Art

Conventionally, center cluster modules have been installed in vehicles to accommodate audio equipment. These center cluster modules have been housings for inserting audio equipment components, so that power lines and signal lines have had to be connected to each piece of equipment. This has resulted in complex wiring systems that require much time for equipment installation and are costly.

In addition, each piece of equipment is provided with its own control switches. Thus the driver must lower his or her eyes in order to operate the control switches when controlling a piece of equipment at the bottom of the mounting rack, which is detrimental to driving safety.

Furthermore, the audio equipment accommodated in on-board center cluster modules is being built into single chassis in the interest of lower costs and ease of installation. With this, however, there is little scope for equipment expansion. When purchasing equipment to be installed later, the equipment being added can be installed in the remaining space if more space is available than that occupied by the single chassis system. However, not all add-on equipment is being installed to the body (that is, to the attachment brackets inside the instrument panel).

Moreover, when add-on equipment is purchased from a third-party vendor and installed in the center console, a wire harness must be rigged.

Furthermore, since add-on equipment is not limited to equipment made by the manufacturer of the equipment previously installed, one ends up with equipment switches and displays that are very different in terms of operability, visual verifiability, and uniformity of design, etc. Thus when add-on equipment is accommodated in the center cluster module, equipment operability and visual verifiability suffer, as does driving safety.

Consider a case such as is diagrammed in FIG. 1, where one piece of equipment 403 of size 1DIN and two pieces of equipment 405 and 407 of size half-width DIN are loaded in equipment slot 401. Conventionally, there has only been one slot board connector (not shown in the figure) per tier for connecting DIN-size equipment to a slot board (not shown). Therefore, the two half-width DIN units 405 and 407 must be installed one on top of the other, as depicted in FIG. 1, which wastes a lot of space. In terms of equipment controllability, moreover, it is desirable to install each piece of equipment higher in the rack.

In FIG. 2 is diagrammed the connection between a conventional bus line 161 and housing. A bus line connector 373 is attached to the bus line 161, and a housing connector unit 374 is inserted into the bus line connector 373. The housing is connected through impedance adjustment resistors 375 on the housing connector unit 374 and a jumper line to the bus line 161. In this manner, depending on the mode of connecting various input/output signals to the bus, it is necessary to install jumper wires inside the bus line connector 373.

In FIG. 3 is diagrammed the conventional method of attaching coin boxes. When installing coin boxes 378 and 379 in vehicles not equipped with equipment slots such as described above, it is necessary to use special brackets 377 or the like to make the installation inside the center cluster. This is inefficient.

SUMMARY OF THE INVENTION

With the foregoing in view, an object of the present invention is to provide a center cluster module and system therefor that enhances ease of vehicular installation, lowers costs, and secures greater safety.

Another object of the present invention is to provide an electrical equipment connector system that makes efficient use of installation space.

In order to achieve the objects noted above, there is provided a center cluster module comprising: first equipment connection slots in and from which multiple pieces of electrical equipment installed in a vehicle can be freely installed and removed; a first bus line that is provided at the back of the first equipment connection slots to mutually connect the multiple pieces of electrical equipment installed in the first equipment connection slots; operating means having multiple operating switches arranged in a single unit, the operating switches being provided in correspondence to the multiple pieces of electrical equipment for producing control signals to control each of the multiple pieces of electrical equipment; and first control means for controlling, through the first bus line, the electrical equipment corresponding to the operating switch manipulated, when any of the operating switches of the operating means is manipulated.

According to the present invention, each of the multiple pieces of electrical equipment can be freely installed in, removed from, or changed out of the first equipment connection slots, and the mounted multiple pieces of electrical equipment are mutually connected by the first bus line, so ease of assembly is enhanced. Moreover, the multiple operating switches of the operating means are incorporated in a single unit and are provided corresponding to the multiple pieces of electrical equipment. Thus, when any one of the operating switches is manipulated, the first control means controls the piece of electrical equipment corresponding to the manipulated control switch, through the first bus line. In other words, the multiple pieces of electrical equipment are controlled at one time by the operating means, so there is no need to provide separate control switches for each piece of electrical equipment. Thus costs can be reduced and safety enhanced.

In a preferred embodiment of the present invention, display means are also provided for displaying information for each of the multiple pieces of electrical equipment.

In a preferred embodiment of the present invention, the multiple pieces of electrical equipment comprise first electrical equipment of ordinary size and second electrical equipment of half ordinary size. Multiple first connectors all of the same size are provided in the first equipment connection slots. A second connector is provided which has a first connection unit that connects to each of the first connectors, and a second connection unit and third connection unit that connect to two pieces of second electrical equipment placed in parallel in the longitudinal dimension of the first connectors. The first electrical equipment is configured so that it may be freely attached to or detached from each of the first connectors. Two pieces of the second electrical equipment placed in parallel are configured so that they may be freely attached to or detached from each of the first connectors through the second connector.

In order to achieve the objects noted above, there is further provided a center cluster module system comprising: the above-mentioned center cluster module; a second bus line connected to the center cluster module; and an expansion module that is connected to the second bus line for communicating with the center cluster module. The expansion module comprises: second equipment connection slots in and from which multiple pieces of electrical equipment can be freely installed or removed; a third bus line that is installed at the back of the second equipment connection slots and that mutually connects the multiple pieces of electrical equipment installed in the second equipment connection slots; and second control means when any of the operating switches of the operating means inside the center cluster module is manipulated, the electrical equipment corresponding to the manipulated operating switch through the first and second bus lines.

In accordance with the present invention, in the expansion module, the multiple pieces of electrical equipment mounted in the second equipment connection slots are mutually connected by the third bus line. When any one of the operating switches of the operating means are manipulated, the second control means controls the piece of electrical equipment corresponding to the manipulated operating switch, through the second and third bus lines. In other words, by manipulating the operating switches, one can control any of the multiple pieces of electrical equipment inside the expansion module.

A preferred embodiment of the present invention further provides: decision means for deciding whether the first, second, or third bus line is malfunctioning when the multiple pieces of electrical equipment are being operated via the first, second, and third bus lines; switching means for switching the multiple pieces of electrical equipment so that they can perform stand-alone operation when a malfunction occurs on at least one of the first, second, and third bus lines; and third control means for controlling the stand-alone operation of the multiple pieces of electrical equipment based on a switching signal supplied from the switching means.

In accordance with the present invention, when the multiple pieces of electrical equipment are operated via the bus lines, the decision means decides whether or not there is a malfunction on any of the bus lines. The switching means performs switching so that, when any of the bus lines malfunctions, switching is done so that the multiple pieces of electrical equipment, respectively, can perform stand-alone operation. The third control means controls the stand-alone operations of the multiple pieces of electrical equipment, respectively, based on the switching signal supplied from the switching means. In other words, it is possible to control each of the multiple pieces of electrical equipment in stand-alone operation even when a bus line has malfunctioned.

In order to achieve the above-mentioned objects, moreover, there is provided an electrical equipment connector system comprising: multiple pieces of electrical equipment comprising first electrical equipment of ordinary size and second electrical equipment of half ordinary size; equipment connection slots comprising multiple first connectors all of the same size; and second connectors having a first connection unit connecting to each of the first connectors, and a second connection unit and a third connection unit connecting two pieces of second electrical equipment placed parallel in the longitudinal dimension of the first connector. The first electrical equipment is configured so that it may be freely attached to or detached from each of the first connectors. In addition, two pieces of the second electrical equipment placed in parallel are configured so that they may be freely attached to or detached from each of the first connectors through the second connector.

In accordance with the present invention, one piece of second electrical equipment is connected to the second connection unit of the second connector, and the other piece of second electrical equipment is connected to the third connection unit of the second connector, and the first connection unit of the second connector is connected to each of the first connectors, whereby the two pieces of second electrical equipment placed in parallel in the longitudinal dimension of the first connector can be loaded in an equipment connection slot, thereby facilitating the effective utilization of installation space.

In a preferred embodiment of the present invention, the second connector is configured to split signal lines from the first connector, supply the signals on one of the split signal lines to the second connection unit, and supply the signals on the other split signal lines to the third connection unit.

In order to achieve the above-mentioned objects, there is provided a center cluster module comprising: a common unit having common parts and elements as well as a connector that are used commonly independent of a type and/or a grade of a vehicle; and a replaceable unit having parts and elements that can be replanted for automobiles and other vehicles depending on a type and/or a grade thereof, the replaceable unit being connected to the common unit via the connector.

According to the present invention, the common unit is used commonly independent of the type and/or the grade of the vehicle. Only the replaceable unit, which can be freely installed in and removed from the common unit, is required to be changed depending on the type and/or the grade of the vehicle. This results in reduced costs.

In a preferred embodiment of the present invention, the replaceable unit is a switch unit having multiple operating switches incorporated in a single unit, the multiple operating switches being provided in correspondence to the multiple pieces of electrical equipment for producing control signals to control each of the multiple pieces of electrical equipment. The common unit is a body unit comprising equipment connection slots in and from which the multiple pieces of electrical equipment installed in a vehicle can be freely installed and removed, and control means for controlling, when the multiple pieces of electrical equipment are loaded in the equipment connection slots and when any one of the operating switches of the switch unit is manipulated, the electrical equipment corresponding to the manipulated operating switch through the equipment connection slots.

According to the present invention, the body unit is used commonly independent of the type and/or the grade of the vehicle. Only the switch unit, which can be freely installed in and removed from the switch unit, is required to be changed depending on the type and/or the grade of the vehicle. This results in reduced costs.

In a preferred embodiment of the present invention, the common unit is a switch unit having multiple operating switches incorporated in a single unit, the operating switches being provided in correspondence to the multiple pieces of electrical equipment for producing control signals to control each of the multiple pieces of electrical equipment. The replaceable unit is a body unit comprising equipment connection slots in and from which multiple pieces of electrical equipment installed in a vehicle can be freely installed and removed; and control means for controlling, when the multiple pieces of electrical equipment are loaded in the equipment connection slots and when any of the operating switches of the switch unit is manipulated, the electrical equipment corresponding to the manipulated operating switch through the equipment connection slots.

According to the present invention, the switch unit can be used commonly independent of the type and/or the grade of the vehicle. Only the body unit, which can be freely installed in and removed from the switch unit, is required to be changed depending on the type and/or the grade of the vehicle. This saves much costs.

A preferred embodiment of the present invention further comprises a face plate that covers over the equipment connection slot, the face plate being replaceable depending on the type of the multiple pieces of electrical equipment installed in a vehicle.

In accordance with the present invention, the face plate can be changed depending on the type of the multiple pieces of electrical equipment installed in a vehicle. Only the face plate is required to be changed with neither the body unit nor the switch unit is changed. This allows reduction of costs.

In a preferred embodiment of the present invention, the face plate comprises a base plate having multiple first openings of which number is equal to the number of the equipment connection slots, and a replaceable plate having a second opening into which the electrical equipment to be installed in a vehicle is inserted, the replaceable plate being attached in a corresponding one of the first openings depending on the electrical equipment to be installed.

According to the present invention, only the replaceable plate suitable for the electrical equipment to be installed is attached in a corresponding one of the first openings in the base plate. Changing only the replaceable plate suitable for the electrical equipment to be installed allows reduction of costs.

In a preferred embodiment of the present invention, the face plate is a bezel that covers over the switch unit and the equipment connection slot, the bezel being replaceable depending on the type of the multiple pieces of electrical equipment installed in a vehicle.

According to the present invention, the bezel that covers over the switch unit and the equipment connection slot can be changed depending on the type of the multiple pieces of the electrical equipment. This allows reduction of costs.

In order to achieve the above-mentioned objects, there is provided a center cluster module comprising a body unit having multiple equipment connection slots in and from which multiple pieces of electrical equipment installed in a vehicle are inserted and removed, and a first connector; and a switch unit having multiple operating switches for producing operating signals to operate the multiple pieces of electrical equipment, the switch unit being removably attached to the body unit through the first connector, the switch unit comprising a base face having a second connector and multiple first openings, the base face being adapted to be connected to the body unit through the first connector; a sub face adapted to be connected to the base face through the second connector, the sub face being replaceable depending on the multiple pieces of electrical equipment connected to the equipment connection slots; and an replaceable plate having a second opening to receive one of the multiple pieces of electrical equipment installed in a vehicle, the replaceable plate being attached in the corresponding one of the first openings depending on the multiple pieces of electrical equipment connected to the equipment connection slots.

According to the present invention, the sub face can be changed depending on the multiple pieces of electrical equipment connected to the equipment connection slots. The replaceable plate is attached in the corresponding one of the first openings depending on the multiple pieces of electrical equipment connected to the equipment connection slots. The base face can thus be used as a common part, which reduces costs.

In a preferred embodiment of the present invention, the center cluster module further comprises a light emitting unit provided on the base face; and a light guiding member provided between the base face and the sub face to guide a light beam from the light emitting unit to the operating switches of the sub face.

According to the present invention, the light guiding member guides a light beam from the light emitting unit on the base face to the multiple operating switches to illuminate them. This improves visual verifiability especially in a dark environment.

In a preferred embodiment of the present invention, the center cluster module further comprises a first optical communication unit having a first light receiving and emitting unit for receiving and emitting a light beam, the first optical communication unit being removably attached to the base face; and a second optical communication unit having a second light receiving and emitting unit for optical communication with the first light receiving and emitting unit, and a battery for use in operating the second light receiving and emitting unit, the second optical communication unit being removably attached to the sub face.

According to the present invention, the light beam from the first light receiving and emitting unit in the first optical communication unit that is removably attached to the base face is received by the second light receiving and emitting unit in the second optical communication unit that is removably attached to the sub face. This establish communication between the base and sub faces. The second optical communication unit may be attached in the sub face. Under such a circumstances, the second light receiving and emitting unit is operated by the battery and the module itself becomes portable.

In a preferred embodiment of the present invention, the base face is provided with a first light receiving and emitting unit for receiving and emitting a light beam and the sub face is provided with a removable optical communication unit having a second light receiving and emitting unit for communicating with the first light receiving and emitting unit, and a battery for operating the second light receiving and emitting unit.

According to the present invention, the first light receiving and emitting provided in the base face is allowed to communicate with the second light receiving and emitting unit in the optical communication unit removably attached to the sub face.

The nature, principle and utility of the invention will become more apparent from the following detailed description when read in conjunction with the accompanying drawings.

DESCRIPTION OF THE PREFERRED EMBODIMENTS

<First Embodiment>

Figure 1:
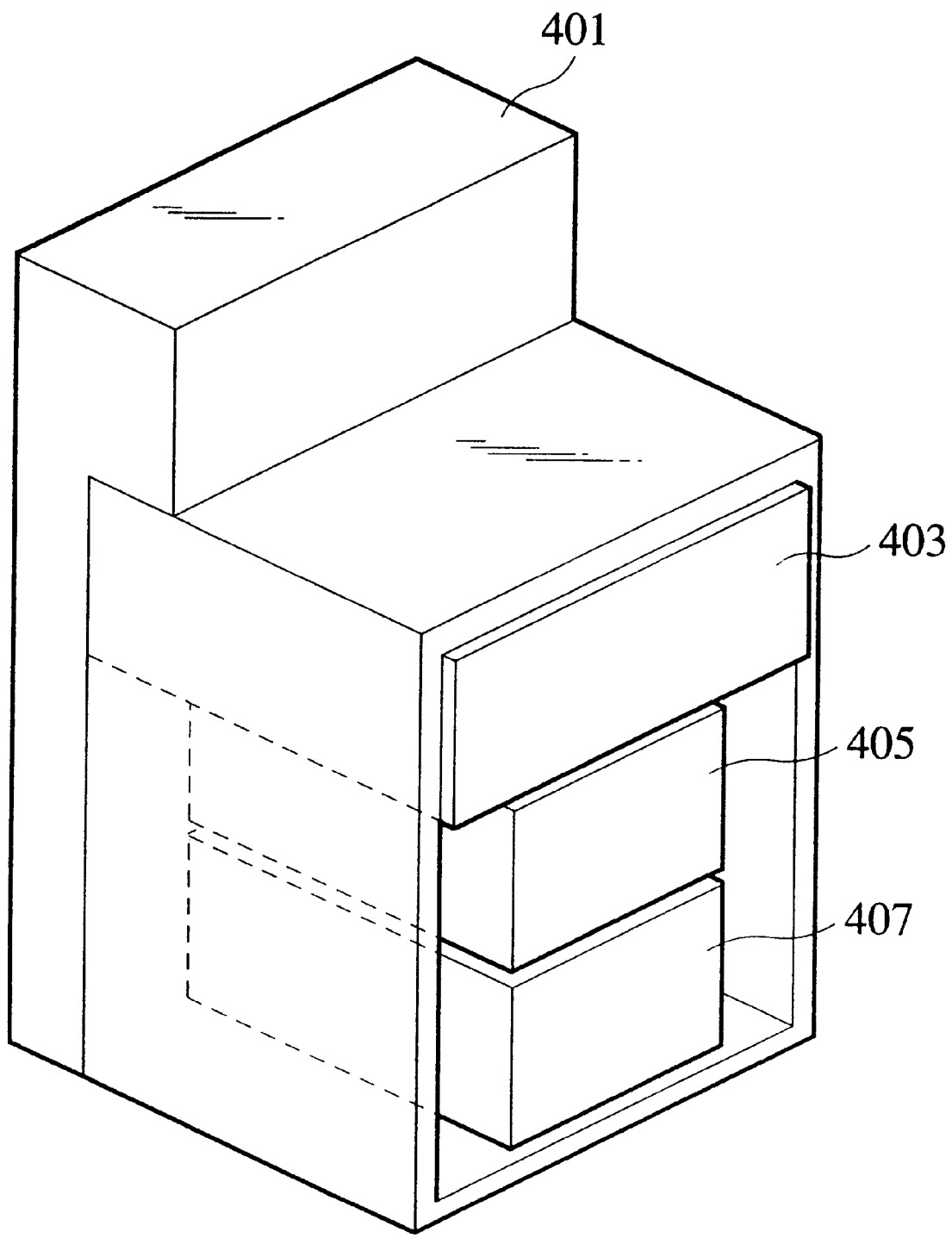
FIG. 1 is a diagram of a conventional installation in a rack for 1DIN size equipment.
Figure 2:
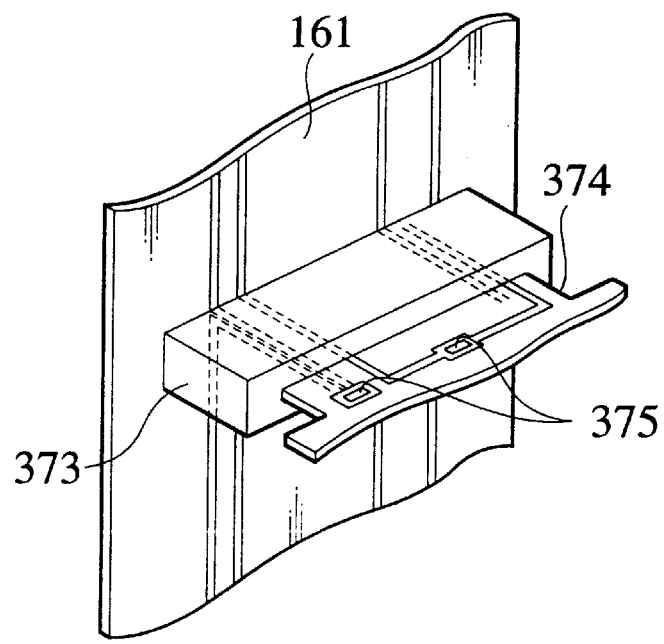
FIG. 2 is a diagram of conventional connections between a bus line and housing.
Figure 3:
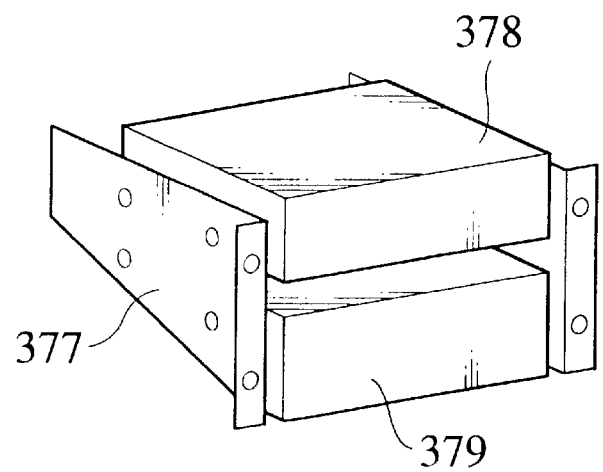
FIG. 3 is a diagram of a conventional method for attaching coin boxes.
Figure 4A:
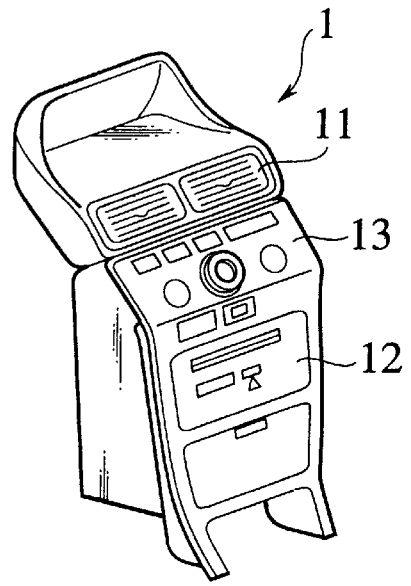
FIG. 4A is a configurational diagram of a center cluster module.

A first embodiment of the center cluster module of the present invention will now be described. FIG. 4A is a configurational diagram of a center cluster module, FIG. 4B depicts a head unit in a center cluster module, FIG. 4C depicts equipment connection slots in a center cluster module, and FIG. 5 is a block diagram of a center cluster module system.

The center cluster module 1 comprises a display block and a standard block (hereinafter, referred to as a head unit) and is mounted in an automobile or other vehicle. The display block comprises a display 11 that displays audio-video data (hereinafter called AV data). The head unit 12 comprises a switch unit 13 and a body unit 14. The body unit 14 comprises a controller 15 and an equipment connection slot 19. The equipment connection slots 19 are designed so that electrical equipment (hereinafter called equipment) such as a radio 35, cassette player 37a, or compact disk player (hereinafter called a CD) 38 can be freely installed or removed.

Figure 4B:
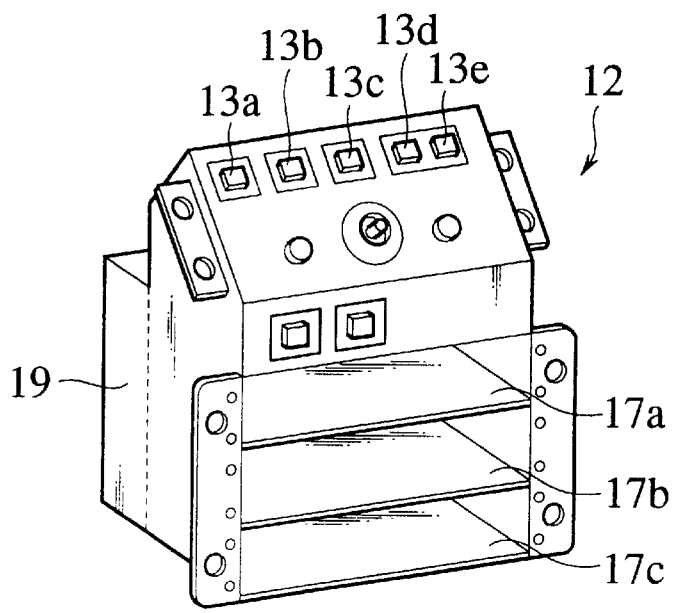
FIG. 4B is a diagram of a head unit in a center cluster module.
Figure 4C:
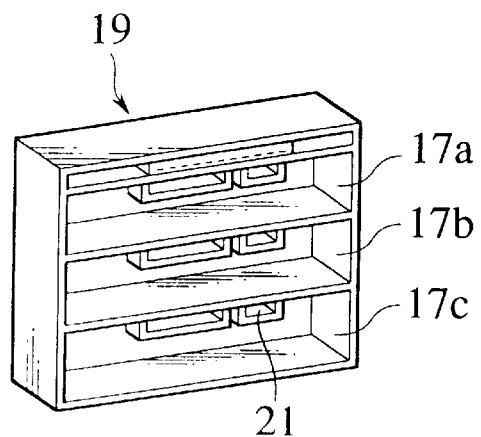
FIG. 4C is a diagram of equipment connection slots in a center cluster module.
Figure 5:
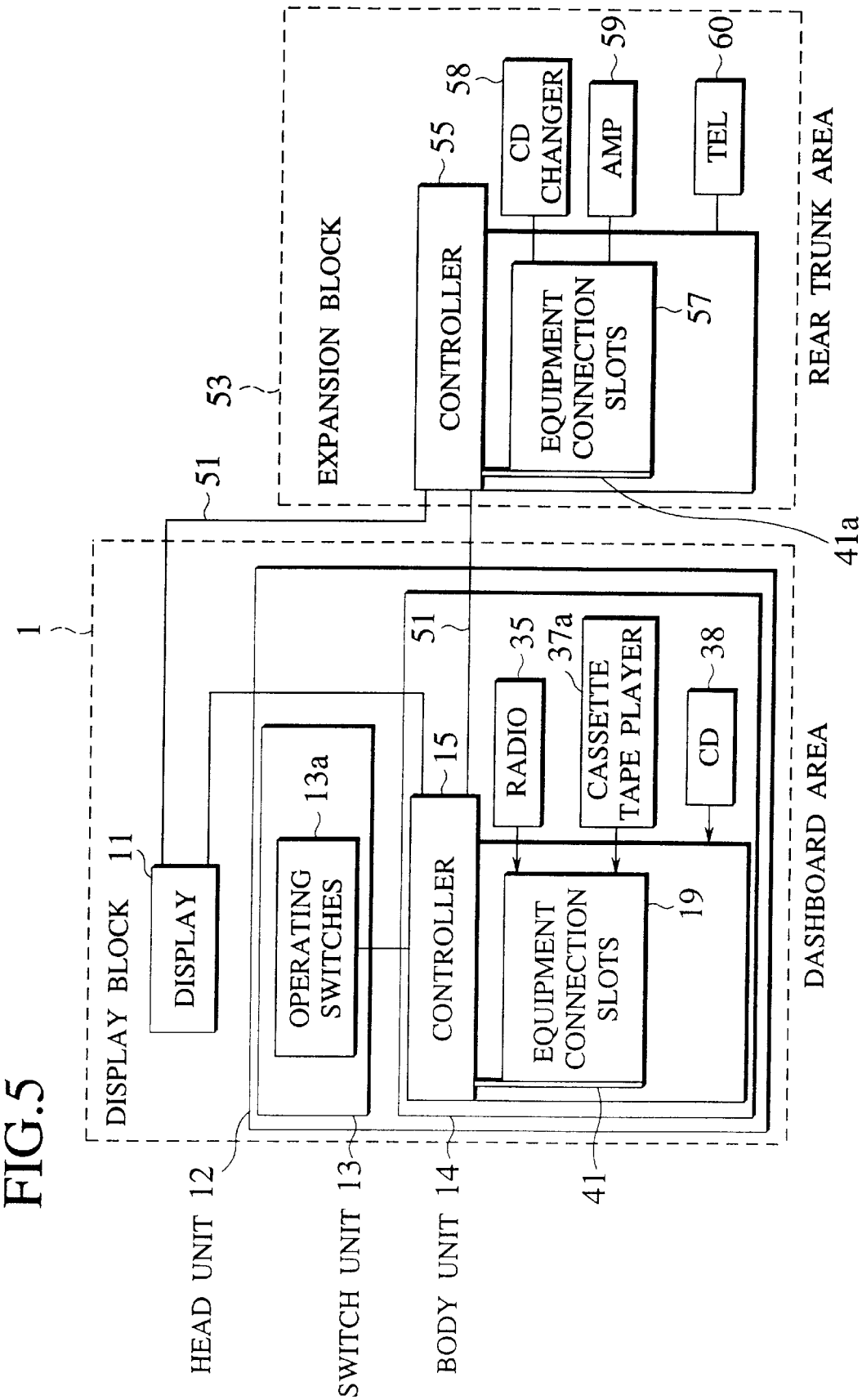
FIG. 5 is a block diagram of a center cluster module system.

The switch unit 13 comprises a plurality of operating switches 13a through 13e, as depicted in FIG. 4B. These operating switches 13a through 13e are provided so as to correspond with the number of pieces of equipment connected in the equipment connection slots 19. Each of the pieces of equipment is controlled by the corresponding operating switch. These operating switches 13a through 13e are installed in an inclined plane so as to be more easily manipulated by the driver, etc.

The controller unit 15 controls the various pieces of equipment connected in the equipment connection slots 19 through a bus line 41 by operating signals supplied from the plurality of operating switches 13a through 13e. This controller 15 is placed below the operating switches 13a through 13e in an area not shown in FIG. 4B. In front there are racks 17a through 17c for installing various pieces of equipment, while in back equipment connection slots 19 are provided as indicated in FIG. 4B.

Figure 6:
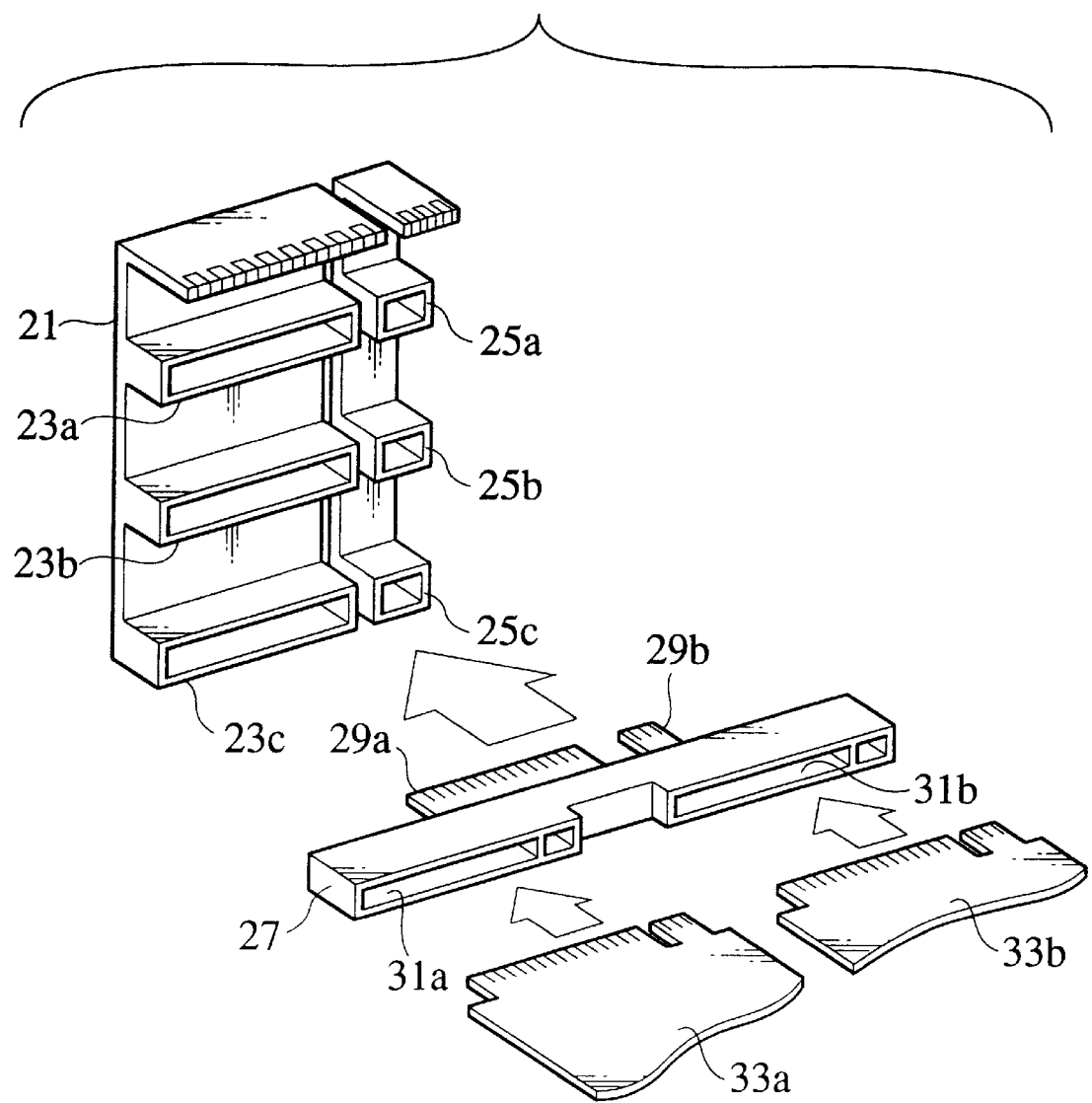
FIG. 6 is a diagram showing the relationships in connecting a slot board, a flat connector, and half-width DIN sized equipment.

The equipment connection slots 19 comprise slot boards 21, as depicted in FIG. 4C, which are built into the racks 17a through 17c. In FIG. 6 is given a detailed view of a slot board. The slot board 21 depicted in FIG. 6 comprises long female connectors 23a through 23c having long openings and short female connectors 25a through 25c having short openings.

A flat connector 27 has a large-sized large-board edge 29a and a small-sized small-board edge 29b. The large-board edge 29a engages a long female connector 23a, and the small-board edge 29b engages a short female connector 25b, such that these can be freely connected and disconnected. To the long female connector 23b and the short female connector 25b, moreover, is engaged another flat connector 27, while in the long female connector 23c and the short female connector 25c is engaged yet another flat connector 27.

Figure 7:
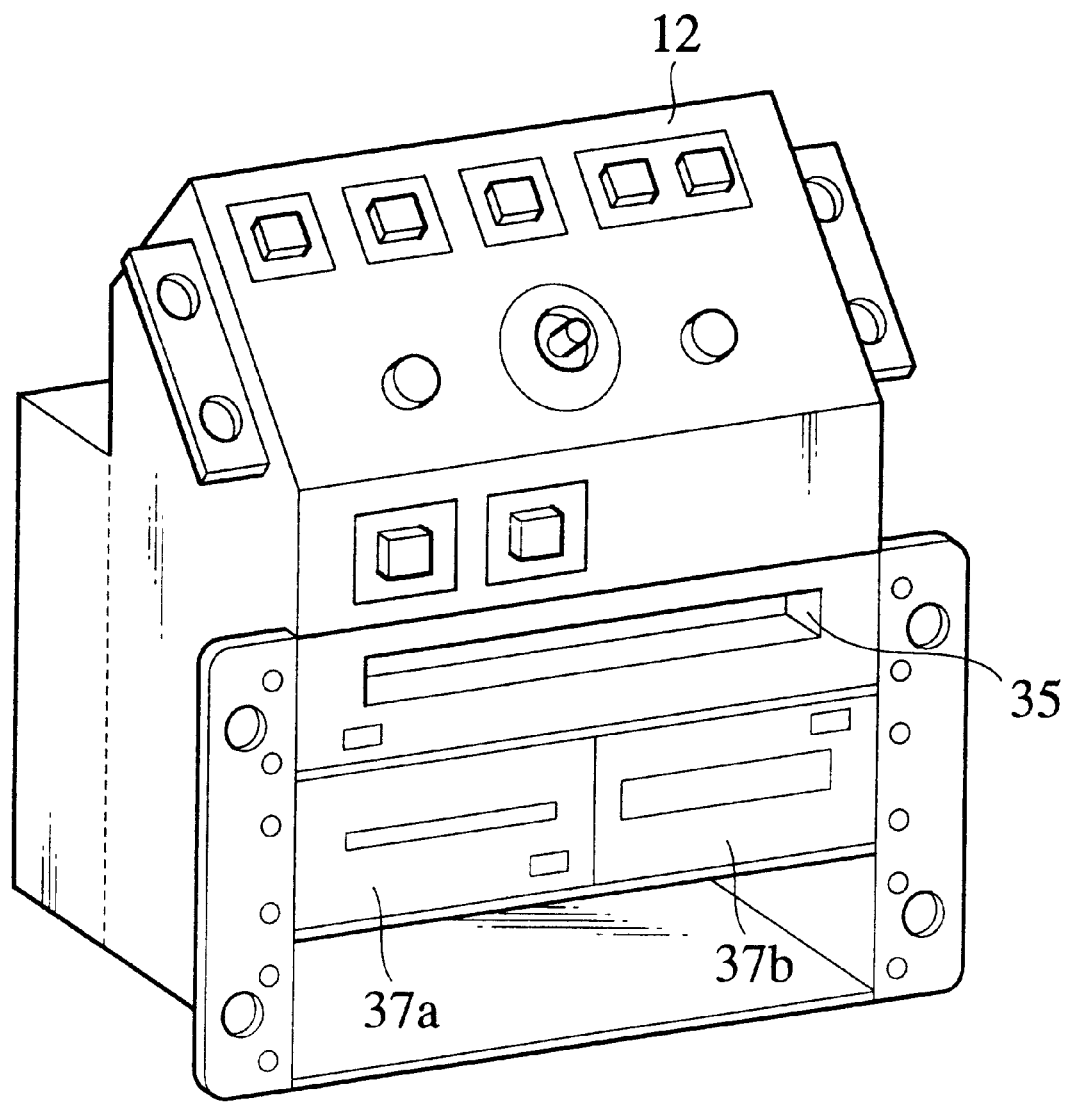
FIG. 7 is a diagram wherein two half-size pieces of equipment are loaded in one rack.

The flat connector 27 is provided with a first opening 31a and a second opening 31b. The first opening 31a is engaged by a board edge 33a for a half-width DIN sized piece of equipment, while the second opening 31b is engaged by a board edge 33b for another half-width DIN sized piece of equipment. Thus, as diagrammed in FIG. 7, a half-width DIN sized piece of equipment 37a and another half-width DIN sized piece of equipment 37b can both be installed in one rack.

Figure 8A:
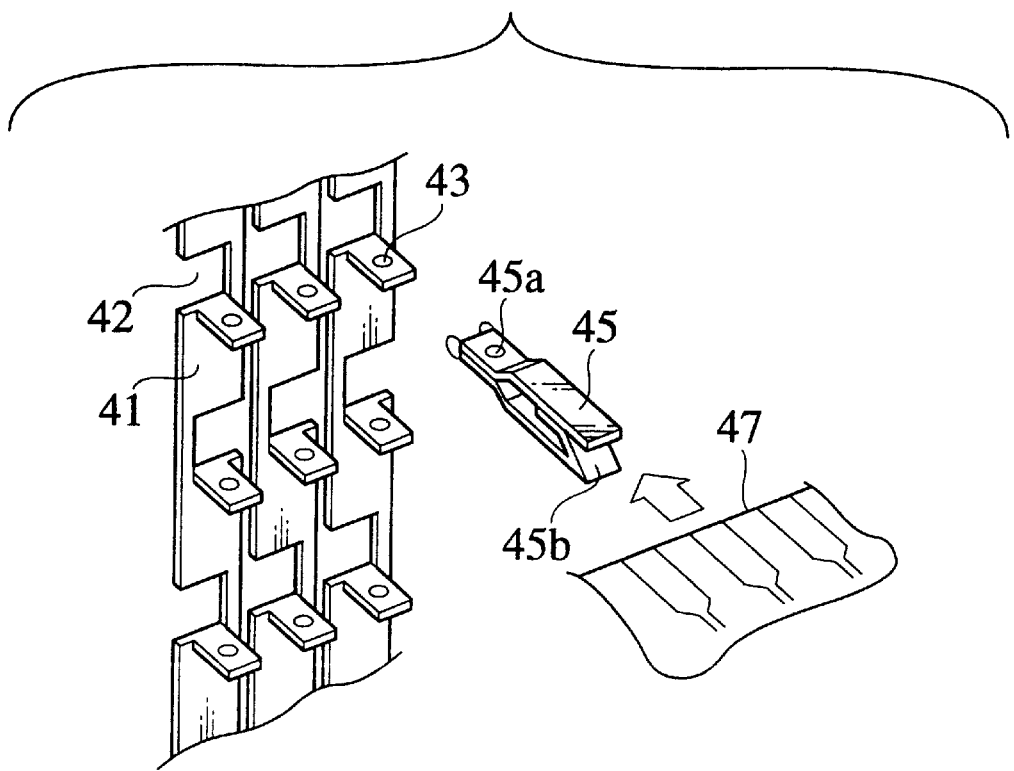
FIG. 8A is a configurational diagram for a bus line.
Figure 8B:
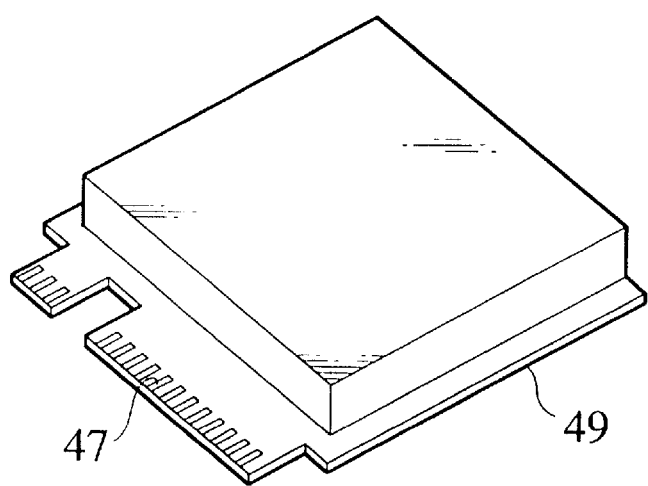
FIG. 8B is a diagram of a piece of optional equipment.

FIG. 8A is a configurational diagram of a bus line, while FIG. 8B depicts a piece of optional equipment connected to the bus line. The bus line 41 is mounted on the back side of the equipment connection slots 19 in FIG. 5, comprises multiple cutouts 42 and multiple terminals 43 along its vertical dimension, which multiple cutouts 42 and terminals 43 are ranked in multiple rows in line with the horizontal dimension thereof. Each of the terminals 43 is soldered to one end 45a of a bus bar 45. The other end 45b of the bus bar 45 is connected with a board edge 47 provided in the optional piece of equipment 49 depicted in FIG. 8B.

In this manner, multiple pieces of equipment are installed in the equipment connection slots 19, the pieces of equipment so installed are connected to a bus line 41, and each piece of equipment is connected to the controller 15 via the bus line 41. The controller 15, meanwhile, is connected to the display 11 and the operating switches 13a, etc.

In other words, the center cluster module 1 is formed as a rack structure, and equipment can be freely changed in and out of the equipment connection slots 19, thereby providing equipment expandability and making assembly easier.

Also, with the manipulation of the plurality of operating switches 13a through 13e in the switch unit 13, the controller 15 controls each piece of equipment through the bus line 41, wherefore it is no longer necessary to provide operating switches 13a through 13e for each piece of a equipment. Nor is it any longer necessary to provide a display for each piece of equipment.

That being so, equipment having no operating switches or display can be freely added, so costs can be reduced. Furthermore, since the plurality of operating switches are positioned all in one place so that the driver can easily manipulate them, driving safety is enhanced.

Figure 9:
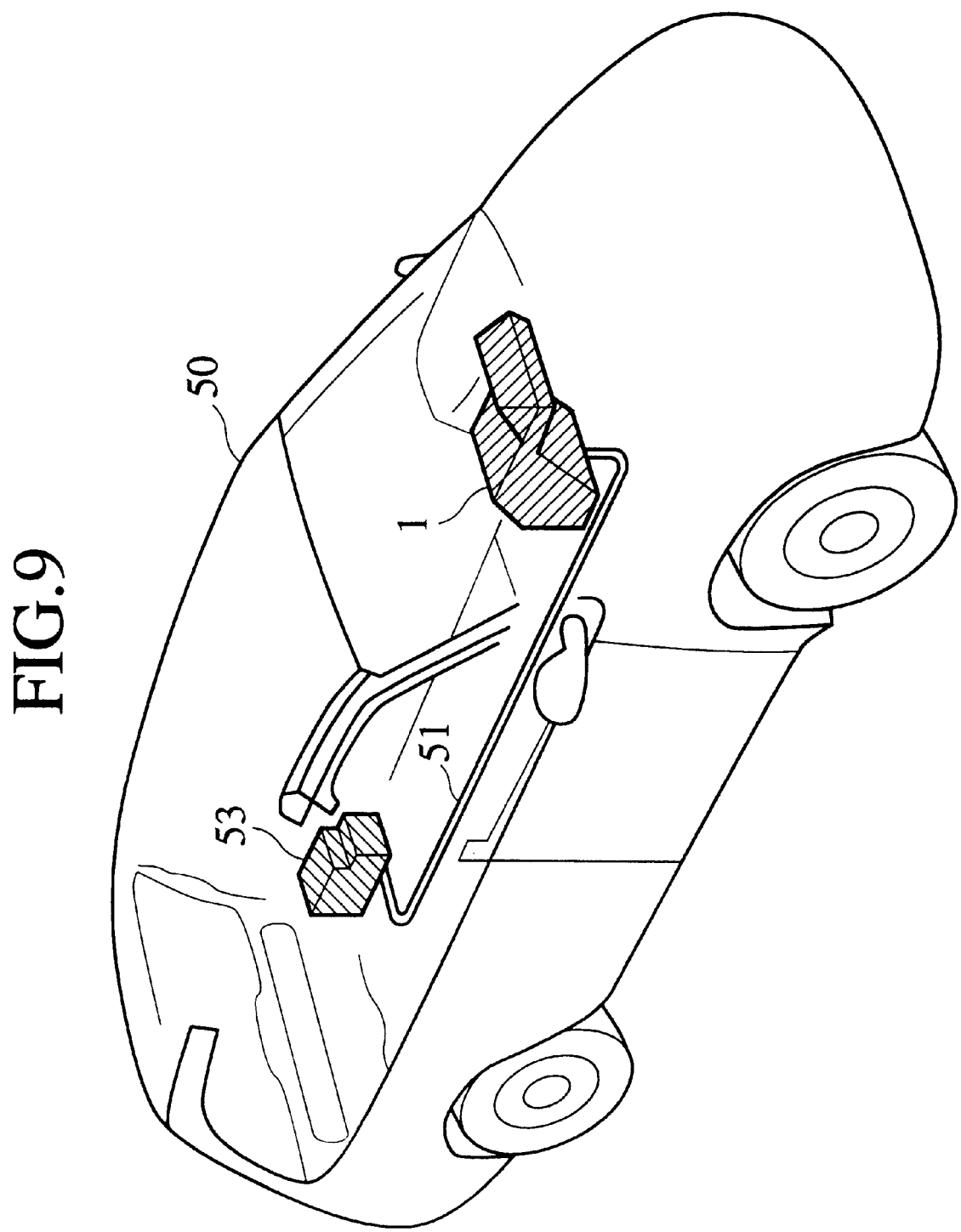
FIG. 9 is a configurational diagram of a center cluster module system installed in a motor vehicle.

In FIG. 9 is diagrammed one example configuration of a center cluster module system mounted in a vehicle. This center cluster module system is a system that transmits data, within the vehicle, between a center cluster module 1 comprising a standard block, and an expansion block 53 serving as an expansion module.

In FIG. 9, the center cluster module 1 is positioned in the forward dashboard area of a vehicle 50. This center cluster module 1 is connected to the expansion block 53 positioned in the rear trunk area via a bus line 51.

Figure 10:
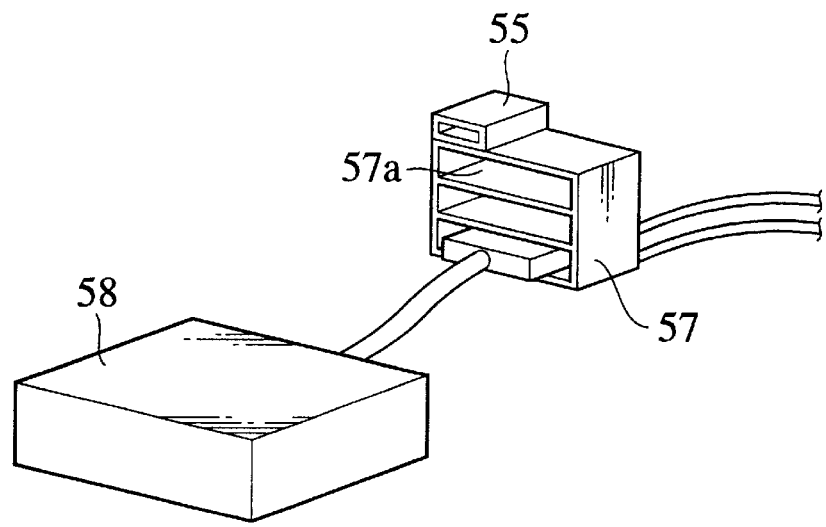
FIG. 10 is a configurational diagram of an expansion block placed in the rear trunk area.

In FIG. 10 is given a configurational diagram of the expansion block 53 located in the rear trunk area. The expansion block 53 houses equipment such as a CD changer or MD changer that cannot be accommodated in the standard block in the center cluster module 1.

As is depicted in FIGS. 5 and 10, the expansion block 53 comprises such equipment as a controller 55 comprising a communications IC, etc., together with equipment connection slots 57, a CD changer 58, an amplifier (AMP) 59, and a telephone (TEL) 60, etc. The CD changer 58, the amplifier 59, and the telephone 60 are severally engaged through expansion connectors 57a to the equipment connection slots 57. A bus line 41a (illustrated in FIG. 5) having the same configuration as the bus line depicted in FIG. 8A is provided at the back of the equipment connection slots 57, to which bus line 41a the equipment is connected.

In addition, as shown in FIG. 5, the controller 15 is connected to the controller 55 via the bus line 51. Thus pieces of equipment accommodated in the expansion 53 can be remotely controlled by the operating switches 13a via the bus line 51.

Figure 11:
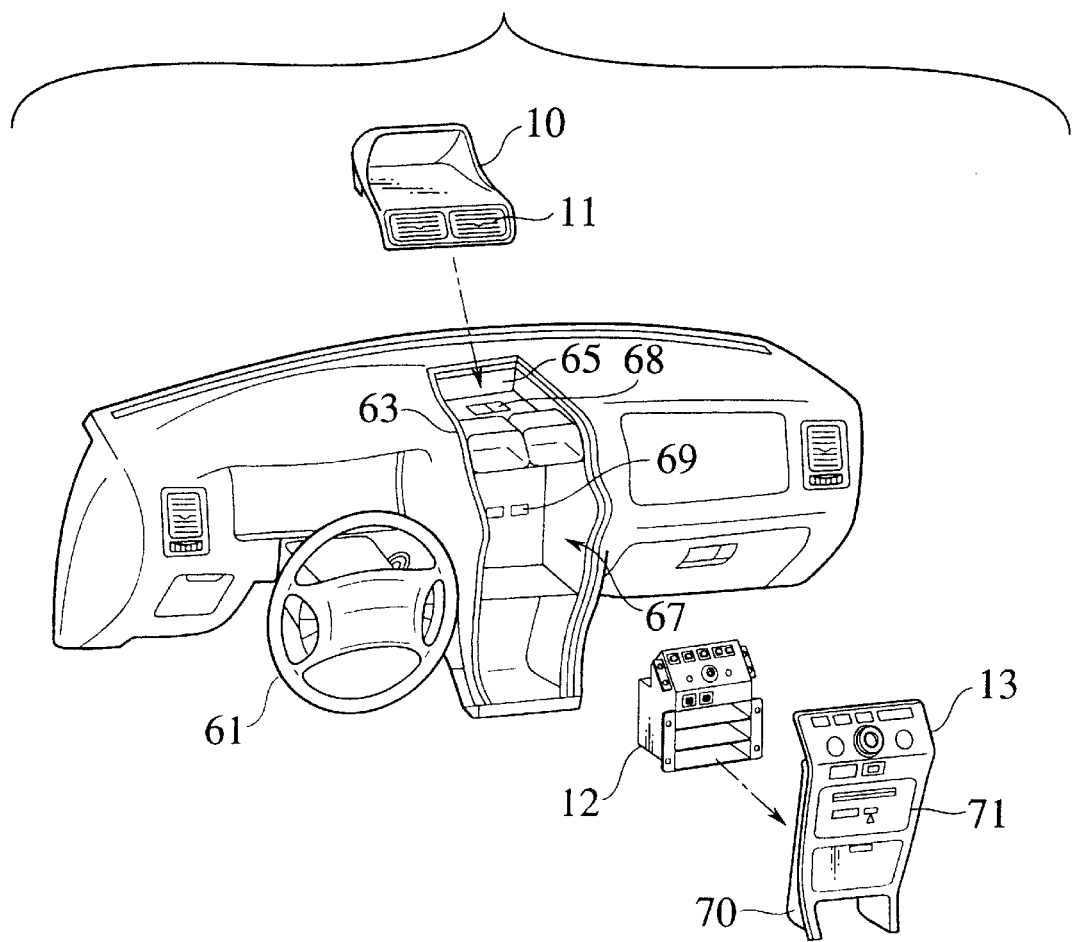
FIG. 11 is a diagram depicting installation of a center cluster module into a rack.

FIG. 11 diagrams how the center cluster module is built into a rack. In FIG. 11, a center console 63 is positioned to the right of the steering wheel 61, and a display unit 10 comprising a display 11 is installed in a channel 65 and connected to a connector 68. In the display unit 10, it is possible to have a display device selected either in conjunction with a selected piece of equipment or according to the wishes of the user.

The head unit 15 which contains expansion racks is built into a center cluster bezel 70, to which center cluster bezel are attached face panels 71. This completes the center cluster module 1. The center cluster module 1, so completed, is installed in an expansion rack 67. The center cluster module 1 is connected to a connector 69, and electrically connected to the bus line 51.

Figure 12:
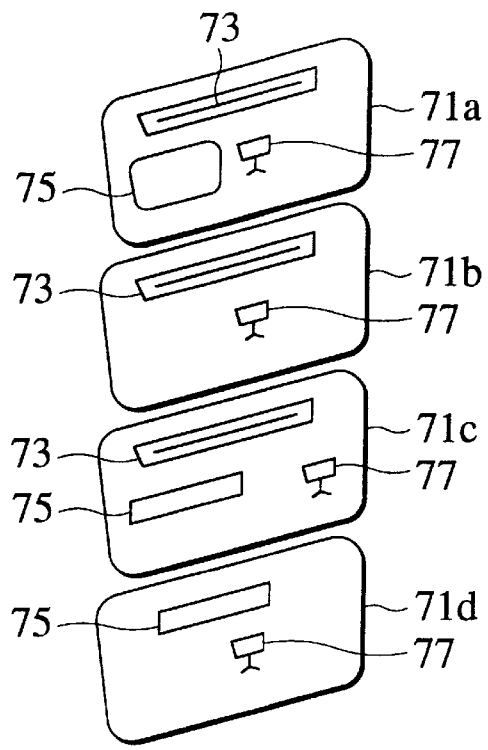
FIG. 12 is a diagram showing examples of face panels.

In FIG. 12 are depicted examples of face panels. These face panels 71a, 71b, 71c, and 71d are provided with openings 73 for CD, MD, or other equipment drives, and printing is done on a print unit 75. These face panels are cosmetically designed so as to match the equipment installed in the expansion rack. Thus it is possible to viably implement expandable equipment using these face panels.

Figure 13:
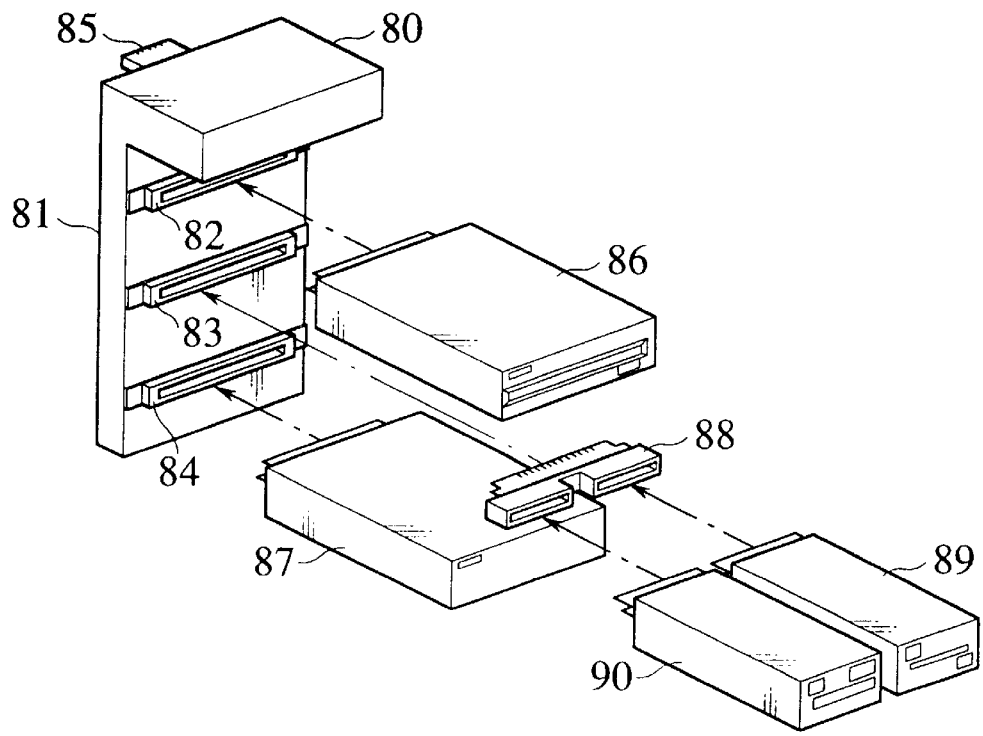
FIG. 13 is a configurational diagram of a connector system corresponding to half-width DIN sized equipment.

In FIG. 13 is diagrammed a half-width DIN sized equipment connector system. This half-width DIN sized equipment connector system configures an electrical equipment connector system. This connector system is provided with a connection equipment slot 80. The connection equipment slot 80 comprises a slot board 81. This slot board 81 comprises slot-board-mounted connectors 82, 83, and 84, as first connectors, arranged at equal intervals in the vertical dimension. At the upper left edge of the slot board 81 there is a board edge 85.

The slot-board-mounted connector 82 is designed so that a CD player or other IDIN sized equipment 86 can be freely engaged thereto or disengaged therefrom. The slot-board-mounted connector 84 is designed so that an amplifier or other 1DIN sized equipment 87 can be freely engaged thereto or disengaged therefrom.

Figure 14:
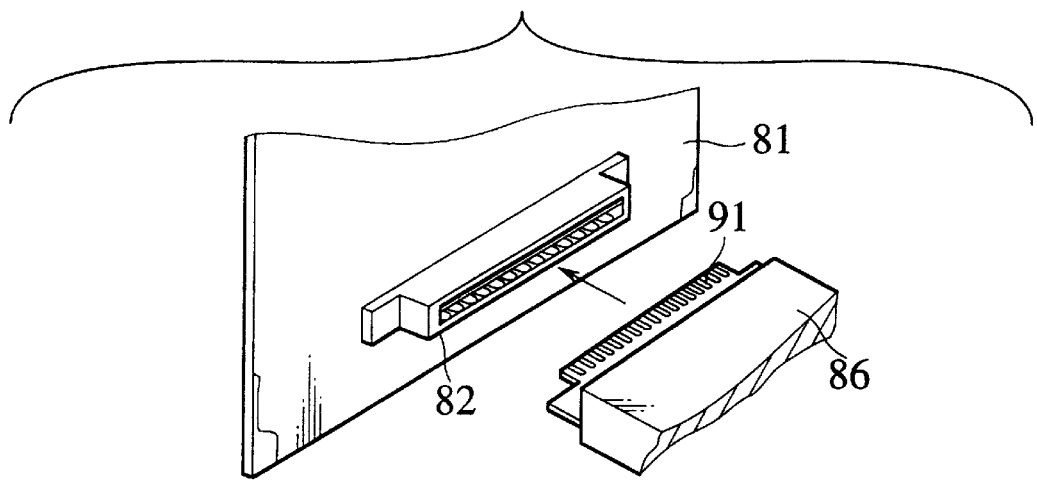
FIG. 14 is a diagram depicting a connection between a connector on a slot board and a DIN sized piece of equipment.

FIG. 14 depicts the connection between a slot-board-mounted connector and a piece of DIN sized equipment. The 1DIN sized equipment 86 is provided with a flat connector 91, which is connected to the slot-board-mounted connector 82. Thus, using flat connectors 91, the power lines or I/O lines of various types of equipment can be connected to the slot-board-mounted connector 82.

Figure 15:
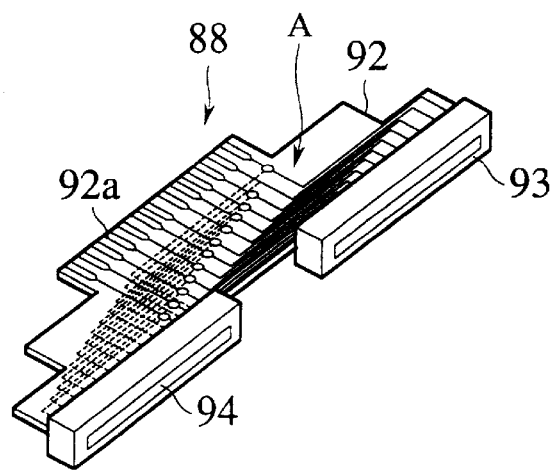
FIG. 15 is a sketch of a connector for half-width DIN sized units.

Further, as depicted in FIG. 13, the slot-board-mounted connector 83 is fashioned so that a connector 88 for a half-width DIN size unit can be connected as a second connector. FIG. 15 provides a sketch of a connector for half-width DIN sized units.

As is depicted in FIG. 15, the connector 88 for half-width DIN sized units comprises a board edge 92a as a first connector unit for connecting to the slot-board-mounted connector 83, together with a printed circuit board 92 printed on both sides, a connector 93 (slot 1) as a second connector unit that is connected to an integrated circuit (IC) card or other half-width DIN sized equipment 89, and a connector 94 (slot 2) as a third connector unit that is connected to a magnetic disk (MD) unit or other half-width DIN sized unit 90.

Figure 16:
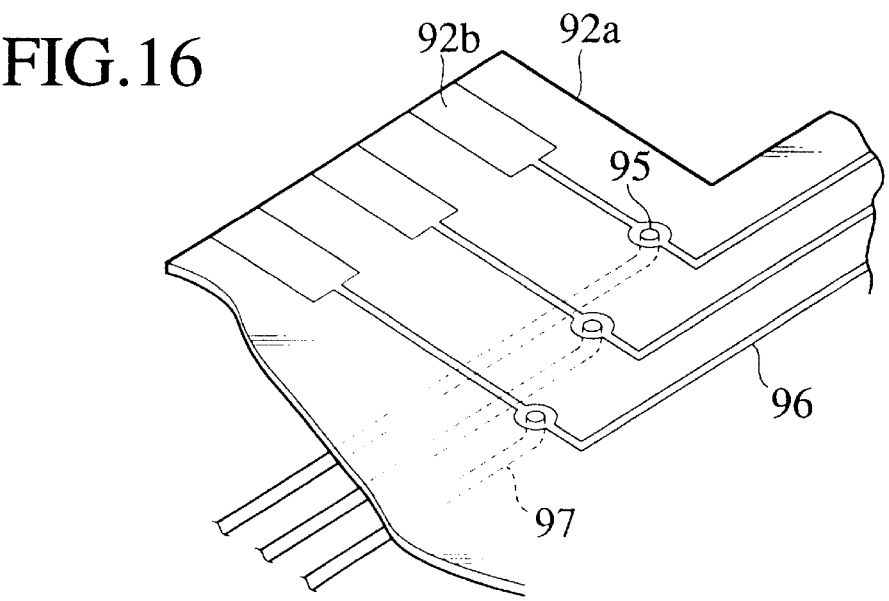
FIG. 16 is a partial detailed diagram of a connector for half-width DIN sized units.

FIG. 16 is a detailed diagram of part A in the half-width DIN size connector 88. On the board edge 92a are made a number of copper foil patterns 92b that correspond with a plurality of lines from the slot-board-mounted connector 83, and each copper foil pattern 92b is provided with a through hole 95.

On the front side of the printed circuit board 92, copper foil patterns 96 are connected to the copper foil patterns 92b via the through holes 95, and these copper foil patterns 96 are connected to the connector 93. The copper foil patterns 92b are connected via the through holes 95 to copper foil patterns 97 (dashed lines in the drawing) on the back side of the board edge 92, and these copper foil patterns 97 are connected to the connector 94.

Based on the configuration described above, by using half-width DIN size connectors 88, each of the lines from the slot-board-mounted connector 83 are split by the through holes 95 and led to two systems of connectors having the same shape as the slot-board-mounted connector, thus permitting two half-width DIN sized pieces of equipment to be connected in the space of a single 1DIN sized piece of equipment. Thus it is possible to effectively utilize the available equipment installation space.

Also, different kinds of equipment can be connected by slot-board-mounted connectors having the same function and shape. This permits interconnections between equipment, and facilitates installation when adding equipment. The printed circuit board may be a multi-layer board instead of one printed on both sides.

Figure 17A:
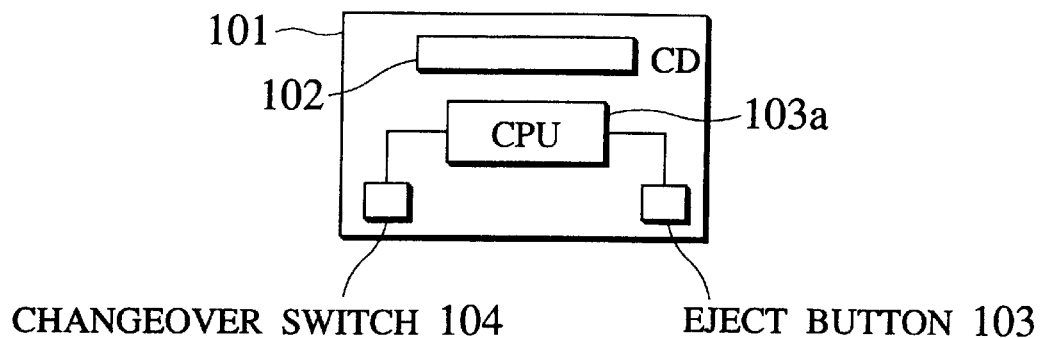
FIGS. 17A–17C are diagrams of examples of stand-alone operation in pieces of equipment during a network failure in a center cluster module system.
Figure 17B:
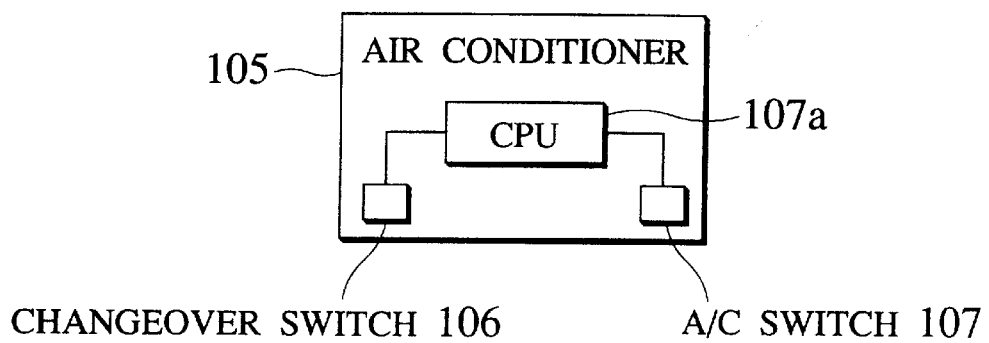

In FIGS. 17A and 17B are depicted examples of stand-alone operation of equipment when there is a network malfunction in the center cluster module system. Let us assume that, in FIG. 5, a short circuit or other malfunction has occurred in the bus line 51 while each piece of equipment is operating under the control of a controller 15 via the bus line 51.

In such a case as this, the controller 15 will no longer be able to control each piece of equipment. That is why the system has been designed so that each piece of equipment can operate in a stand-alone mode during network malfunctions.

FIG. 17A diagrams an example in which a CD unit is operating in stand-alone mode. A CD player 101, shown in FIG. 17A, comprises an opening 102 for loading CDs, an eject button 103 for ejecting CDs, a changeover switch 104 for switching between stand-alone and network modes, and a CPU 103a.

Figure 18:
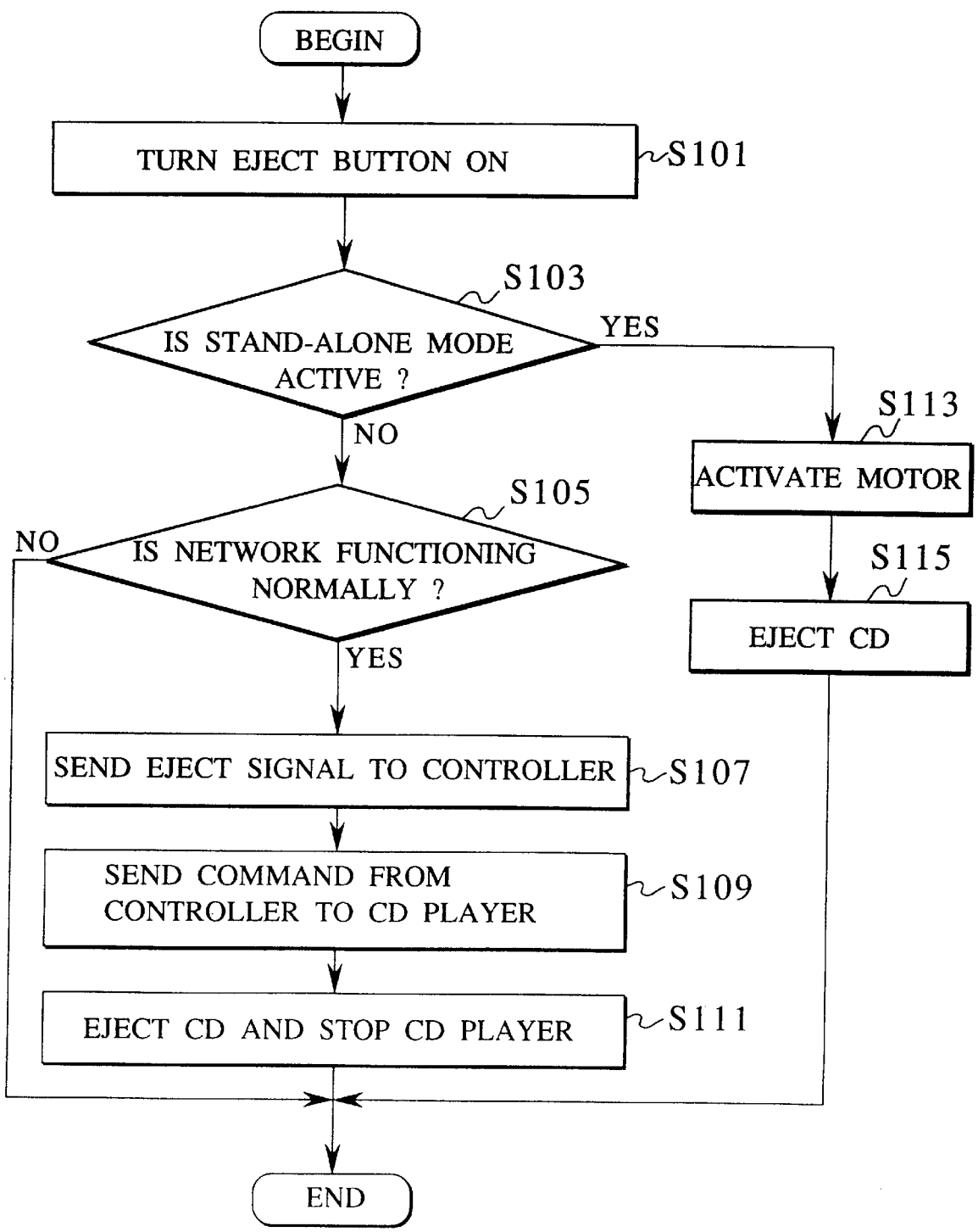
FIG. 18 is a flowchart that explains the stand-alone operation of a CD player.

Stand-alone operation for a CD player will now be described, making reference to the flowchart given in FIG. 18. First, the eject button 103 is pushed (step S101). Next, the CPU 103a determines whether or not the stand-alone mode is active according to signals from the changeover switch 104 (step S103).

If the stand-alone mode is not active, then the CPU 103A determines whether or not the network is functioning normally (step S105). If the network is normal, then the eject signal from the eject button 103 is sent to the controller 15 (step S107).

A command responsive to the eject signal from the controller 15 is sent to the CD player 101 (step 109). The CD player 101 ejects the CD, according to the command, and then stops (step 111).

If, on the other hand, in step S105, the network is not functioning normally, processing is terminated. Also, in step S103, if the stand-alone mode is active, the CPU 103a activates a motor (step S113) which is not shown, and the CD is ejected by the drive of the motor (step S115).

In this manner, when the network is normal, CD ejection and other operations are performed, but when the network is malfunctioning, at the CD player 101, it is only possible to push the eject button and have the CD ejected by the stand-alone operation. In other words, by performing the stand-alone operation, it is possible to control CD ejection, which is the minimum operation.

Next, the stand-alone operation of an air conditioner (hereinafter AC unit) will be described, making reference to FIG. 17B. The AC unit 105 comprises a changeover switch 106 for switching between stand-alone and network modes, an A/C switch 107 to turn the AC unit on and off, and a CPU 107a.

The CPU 107a determines whether the network is normal or abnormal. When the network is functioning normally, changing the changeover switch 106 to the network or turning the A/C switch on or off does not result in any associated operation. In other words, when the network is normal, the controller 15 controls the turning of the AC unit 105 on and off.

On the other hand, if the network is not normal, when the changeover switch 106 is changed to the stand-alone mode, the CPU 107a causes the AC unit 107 to perform stand-alone operations based on switching signals from the changeover switch 106. In other words, if the A/C switch 107 is turned on, the AC unit 105 will begin operating, and if the A/C switch 107 is turned off, the AC unit 105 will stop operating. In other words, it is possible to control the starting and stopping of the AC unit, which are minimum operations, by performing stand-alone operations.

Figure 17C:
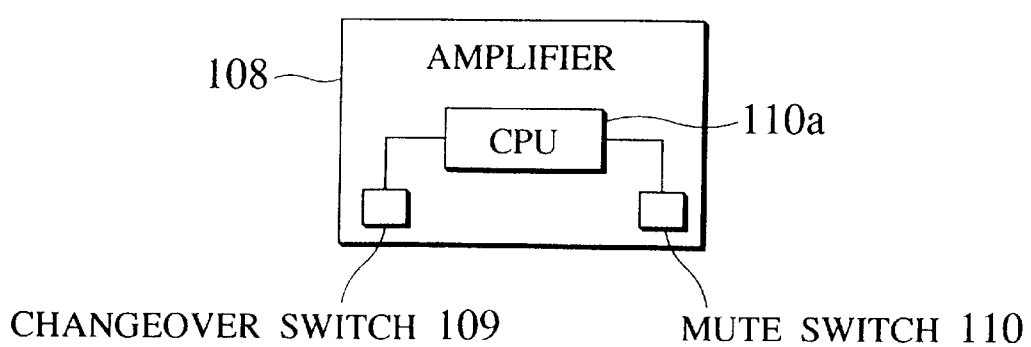

Next, the stand-alone operation of an amplifier is described, making reference to FIG. 17C. An amplifier 108 is provided with a changeover switch 109, a mute switch 110 for turning a mute function on and off, and a CPU 110a.

The CPU 110a determines whether the network is normal or not. When the network is functioning normally, switching the changeover switch 109 to network or operating the mute switch 110 will have no effect on operations. In other words, when the network is normal, the controller 15 controls the turning of the amplifier 108 on and off.

When the network is malfunctioning, on the other hand, if the changeover switch 109 is switched to stand-alone, the CPU 110a causes the mute switch 110 to perform a stand-alone operation according to changeover signals from the changeover switch 109. In other words, if the mute switch is turned on, a mute function is activated, and if the mute switch is turned off, the mute function is turned off. In other words, it is possible to turn the mute function on and off, which is a minimum operation, by performing a stand/alone operation.

Figure 19:
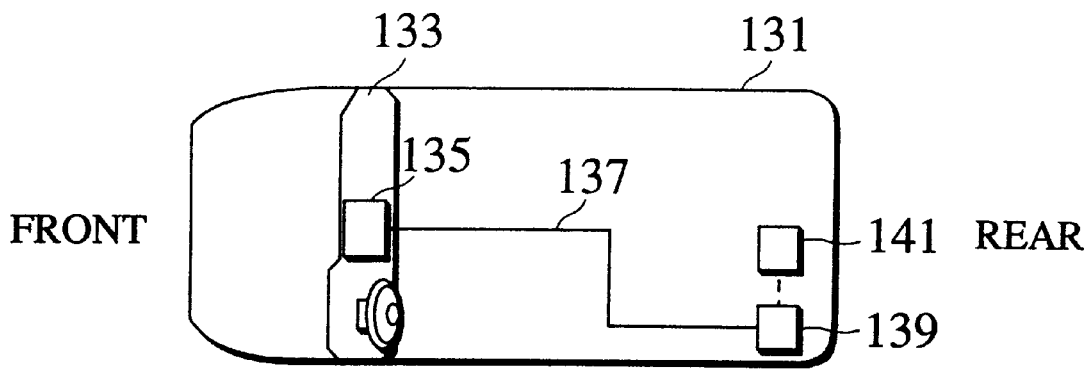
FIG. 19 is a diagram of an on-board network system mounted in a vehicle.

Next, the equipment expansion connectors in a network system installed in a vehicle will be described. FIG. 19 is a diagram of a network system installed in a vehicle. Network system control equipment is installed in the front of a vehicle 131, while vehicle-forward-section equipment slots 135 are provided to permit the installation of optional audio/video (AV) equipment in the instrument panel 133.

In the rear of the vehicle, a vehicle-aft-section equipment expansion connector 139 having a bus line capable of connecting different kinds of equipment on the network is installed. This equipment expansion connector 139 is connected to the vehicle-forward-section slots 135 via a high-speed network line 137.

Figure 20:
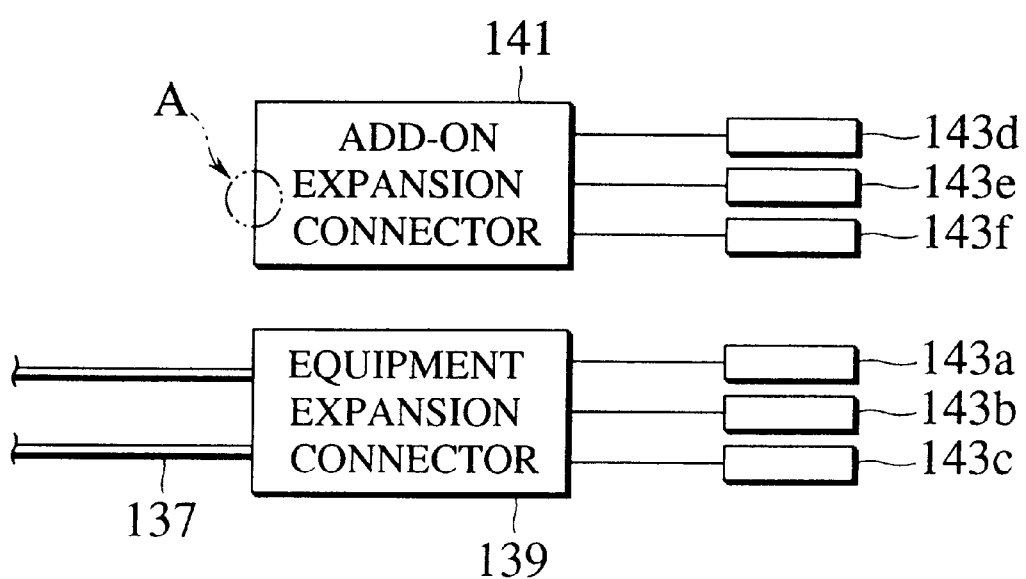
FIG. 20 is a block diagram of equipment connections to equipment expansion connectors in the rear section of a vehicle.

FIG. 20 is a block configurational diagram of equipment connections to the vehicle-aft-section equipment expansion connector. As indicated in FIG. 20, a number of pieces of equipment 143a through 143c are connected to the equipment expansion connector 139, and to the equipment expansion connector 139 is also connected an add-on expansion connector 141. The add-on expansion connector 141 is used for connecting to the network a number of pieces of equipment 143d through 143f that exceeds the number of equipment connections to the equipment expansion connector 139.

Figure 21:
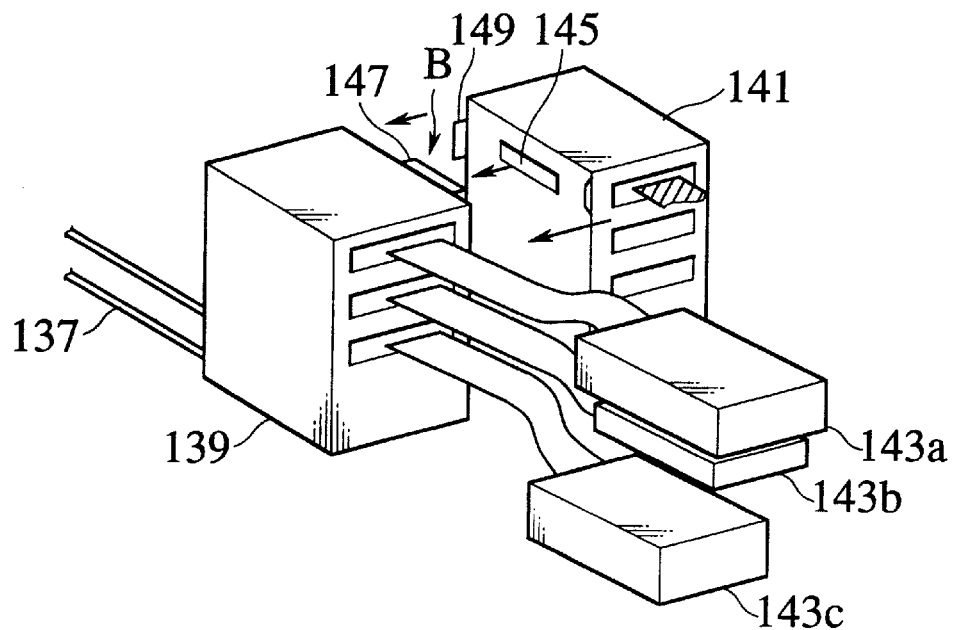
FIG. 21 is a diagonal view of equipment connection to equipment expansion connectors in the rear section of a vehicle.

FIG. 21 provides a diagonal view of equipment connections to the vehicle-aft-section equipment expansion connector. In FIG. 21, a number of pieces of equipment 143a through 143c are connected to the equipment expansion connector 139, and, also, an add-on connector 145 is provided in the add-on expansion connector 141. In the equipment expansion connector 139, meanwhile, a connector 147 is provided that engages the add-on connector 145.

Figure 22:
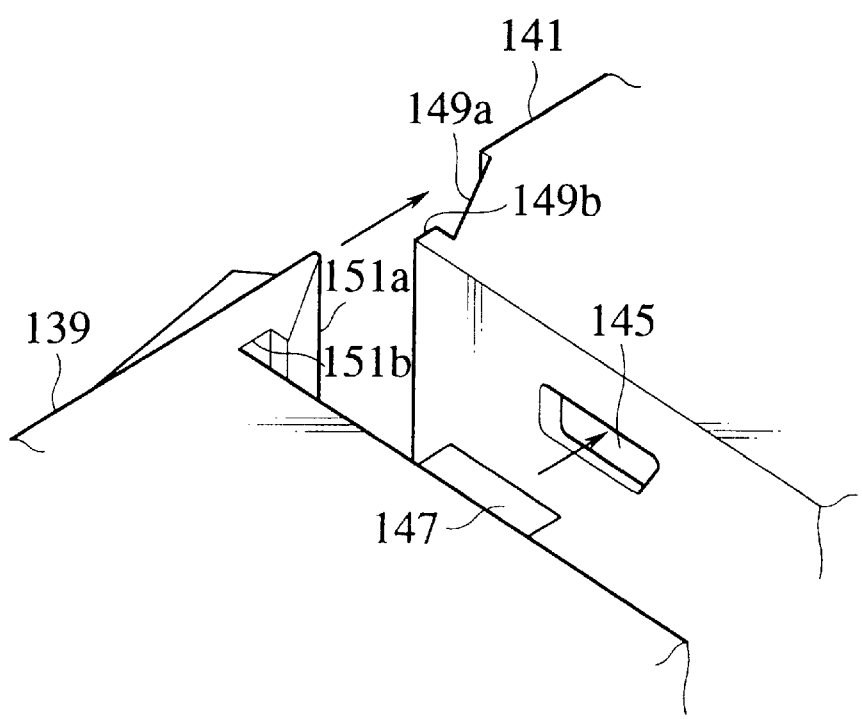
FIG. 22 is a detailed diagram of the engaging parts of an equipment expansion connector and an add-on expansion connector.

FIG. 22 provides details of the engagement part B between the equipment expansion connector 139 and the add-on expansion connector 141. The add-on expansion connector 141 is provided with a cut-out part 149a and a projecting part 149b, while the equipment expansion connector 139 is provided with a tapered part 151a and a channeled part 151b. When the equipment expansion connector 139 and the add-on expansion connector 141 are engaged, the connector 147 engages the add-on connector 145, the projecting part 149a engages the channeled part 151b, and the cut-out part 149a engages the tapered part 151a.

Figure 23:
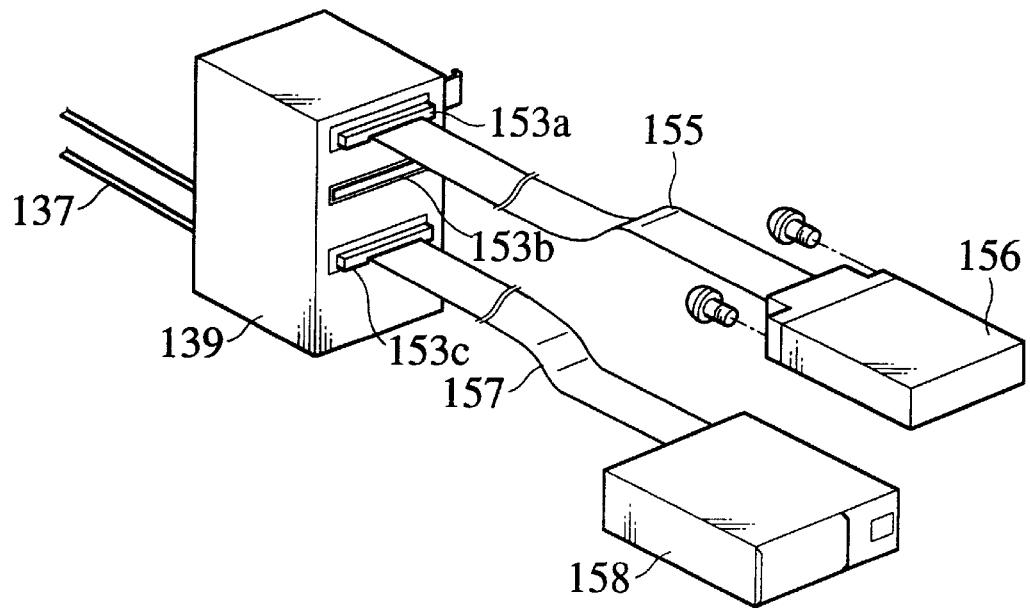
FIG. 23 is a sketch of equipment connection in the rear section of a vehicle.

FIG. 23 is a sketch of equipment connections in the aft section of the vehicle. The equipment expansion connector 139 depicted in FIG. 23 is provided with connectors 153a through 153c. Equipment 156 for the forward-section equipment slots is connected via an intermediate bus cable 155 to connector 153a. The connector 153c is connected to equipment 158 for the forward-section equipment slot 158 via an intermediate bus table 157.

When the configuration described above is employed, an information network system is configured by installing equipment in the vehicle forward-section equipment slots 135 and by connecting equipment to the aft-section equipment expansion connector 139. This not only makes it possible to conserve on wiring materials, but also to make the wiring more efficient and to easily implement equipment expansion. In addition, when conducting various kinds of communications within the network, electromagnetic interference (EMC) is very effectively countered by carrying this information digitally over the high-speed network line.

Figure 24:
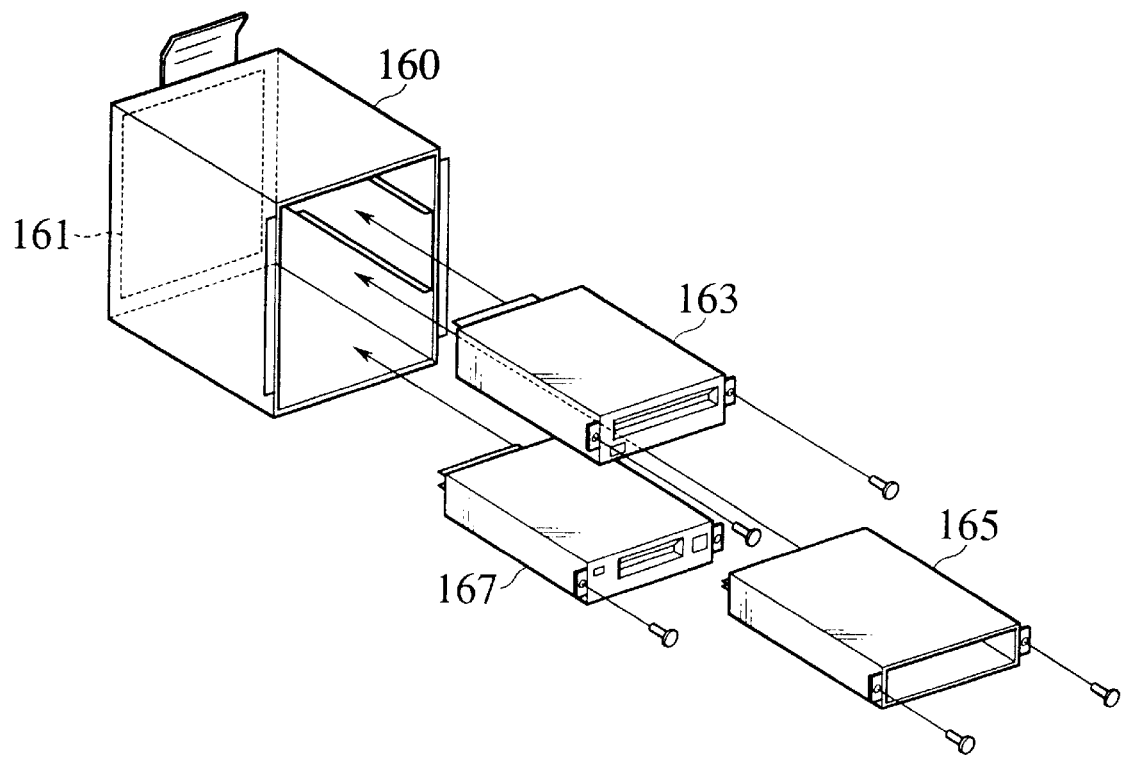
FIG. 24 is a diagram of an example equipment slot application.

A housing corresponding to the on-board equipment slots is next explained. An example of equipment slot application is diagrammed in FIG. 24. On-board equipment slots 160 shown in FIG. 24 are placed in the vehicle center cluster, permitting various kinds of equipment to be mounted. When all of the slots do not have equipment mounted in them, it is possible, according to the user's needs, to mount a housing or coin box in any unused slot position.

Figure 25:
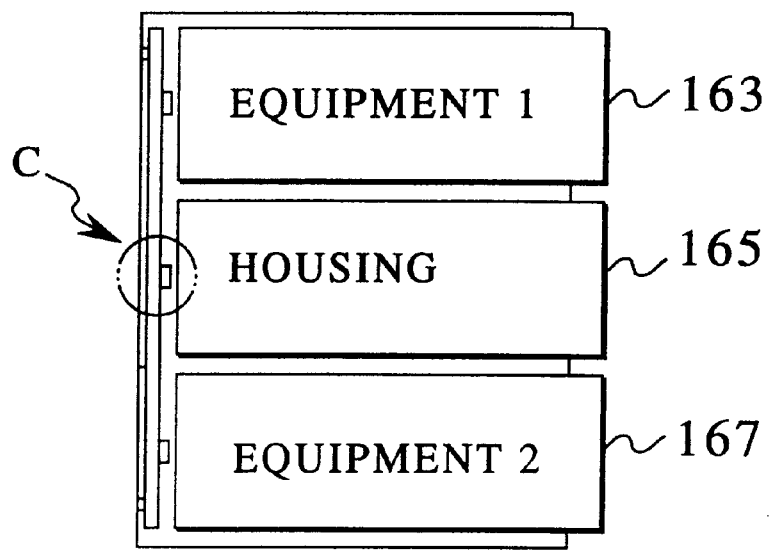
FIG. 25 is a detailed diagram of the interior of an equipment slot mounted in a vehicle.

The on-board equipment slots 160 are equipped with a bus line 161, as depicted in FIG. 24. As depicted in FIGS. 24 and 25, one might have, for example, a piece of equipment 163 installed in the upper level, a housing 165 installed in the middle level, and a piece of equipment 167 installed in the lower level. The number of on-board coin boxes or housings 165 is not limited to one, moreover. Any number of these housings 165 or coin boxes may be mounted, up to the number of slots in which no equipment has been mounted.

Figure 26:
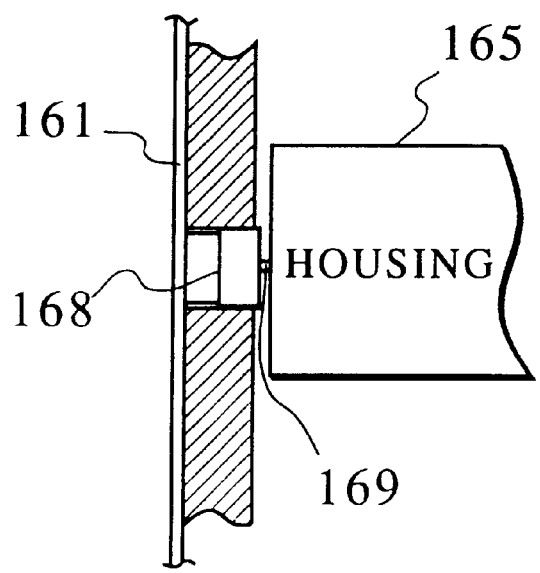
FIG. 26 is a diagram depicting a connection between a jumper connector and a bus line connector.

FIG. 26 provides a detailed diagram of the C part in FIG. 25, that is, of the connection between a jumper connector and a bus line connector. A jumper connector 169 is provided at the back of the housing 165 (or coin box or rack of some kind), on the side of the bus line 161. This jumper connector 169 doubles in function to protect against dust at bus line connectors 168 in the on-board equipment slots 160, and, depending on how the equipment is mounted and configured, various kinds of circuits can be configured using the bus line connectors 168.

Figure 27:
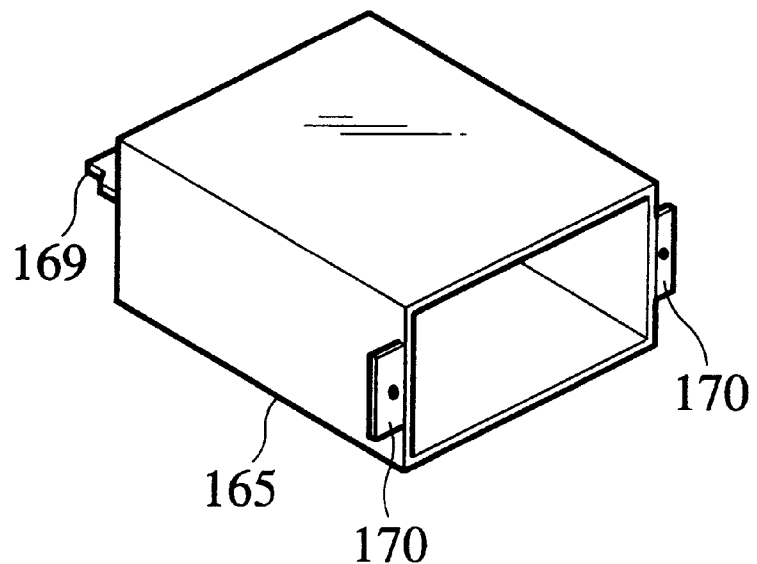
FIG. 27 is a diagonal view of a jumper connector and housing.
Figure 28:
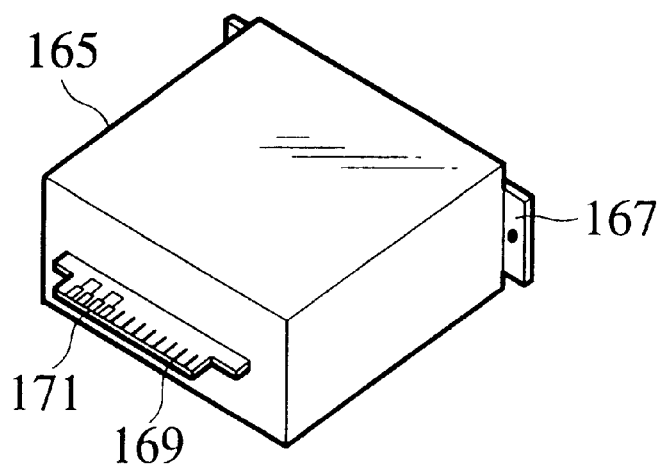
FIG. 28 is a detailed diagram of a jumper connector.

FIG. 27 provides a diagonal view of a jumper connector and a housing, while FIG. 28 provides a detailed view of a jumper connector. As shown in FIG. 27, the jumper connector 169 is provided at the back of the housing 165. When no jumper connector 169 is needed in a bus line or circuit configuration, the jumper connector is not installed on the housing side, and the bus line connector 168 is structured only to prevent dust. As shown in FIG. 28, moreover, a plurality of patterns 171 are arrayed on the jumper connector 169, and the jumper connector 169 is formed integrally with the housing 165.

In the embodiment depicted in FIGS. 24 through 28, user needs may easily be met by installing housings 165, coin boxes, or various kinds of holders in the unused slots in the on-board equipment slots 160. By using such housings 165 as this, moreover, interior space can be utilized effectively.

Furthermore, providing jumper connectors 169 at the back of the housings 165 is an effective measure to protect against dust at the bus line connectors and, depending on what equipment is installed, jumpers may be used to connect to the bus line, permitting various wiring configurations.

<Second Embodiment>

Figure 29A:
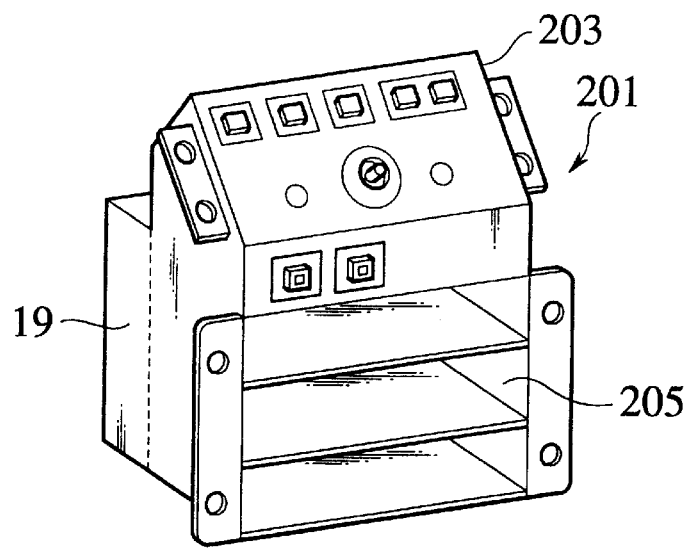
FIG. 29A is a configurational diagram of a center cluster module according to a second embodiment of the present invention.
Figure 29B:
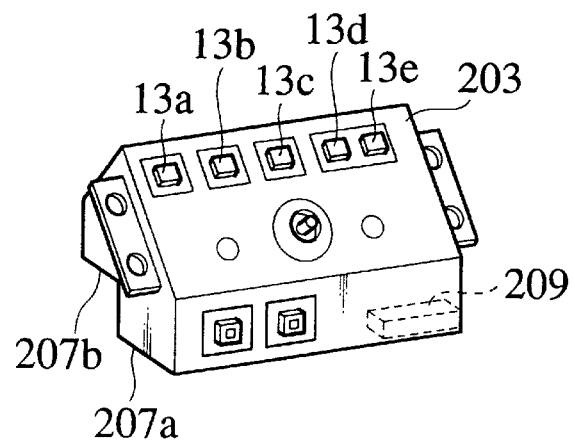
FIG. 29B is a configurational diagram of a switch unit according to the second embodiment.

A second embodiment of the center cluster module of the present invention will now be described. FIG. 29A is a configurational diagram of a center cluster module, FIG. 29B is a configurational diagram of a switch unit, and FIG. 29C is a configurational diagram of a body unit.

A head unit 201 forming the center cluster module comprises a switch unit 203 and a body unit 204 as depicted in FIG. 29A. The switch unit 203 comprises the multiple operating switches 13a through 13e, a convex portion 207a, a concave portion 207b, and a connector 209 provided on the convex portion 207a.

The multiple operating switches 13a through 13e are provided so as to correspond with the number of pieces of equipment. Each of the pieces of equipment is controlled by the corresponding operating switch. These operating switches 13a through 13e are installed in an inclined plane so as to be more easily manipulated by the driver, etc.

Figure 29C:
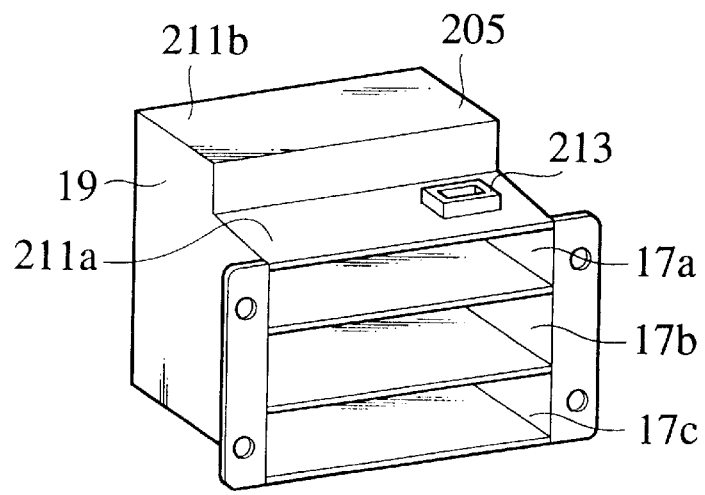
FIG. 29C is a configurational diagram of a body unit according to the second embodiment.

The body unit 205 comprises, as depicted in FIG. 29C, a concave portion 211a, a convex portion 211b, a connector 213 provided at the position corresponding to the connector 209 on the concave portion 211a, and multiple racks 17a through 17c for accepting various pieces of equipment. The connector 213 can be connected removably to the connector 209 to connect the body unit 205 with the switch unit 203 electrically.

The switch unit 203 has the same circuit configuration as the switch unit 13 illustrated in FIG. 5. The body unit 205 has the same circuit configuration as the body unit 14 in FIG. 5. Detailed description thereof will thus be omitted.

As described above, the concave portion 207b of the switch unit 203 is placed on the convex portion 211b of the body unit 205 and the convex portion 207 of the switch unit 203 is placed on the concave portion 211a of the body unit 205 to connect the connector 213 to the connector 209. The switch unit 203 is thus connected to the body unit 205 via the connectors 209 and 213.

Figure 30A:
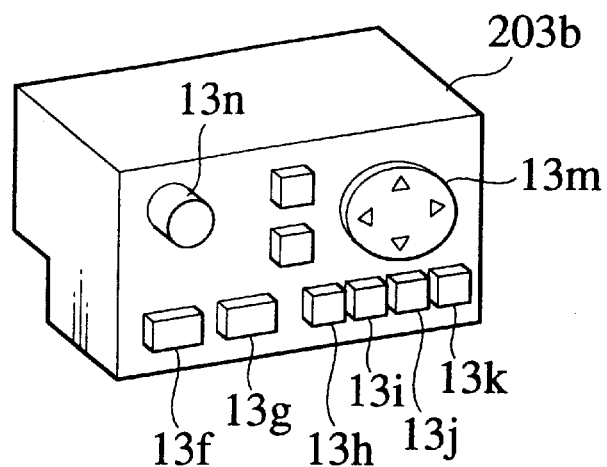
FIGS. 30A and 30B are exemplified diagram of various switch units.
Figure 30B:
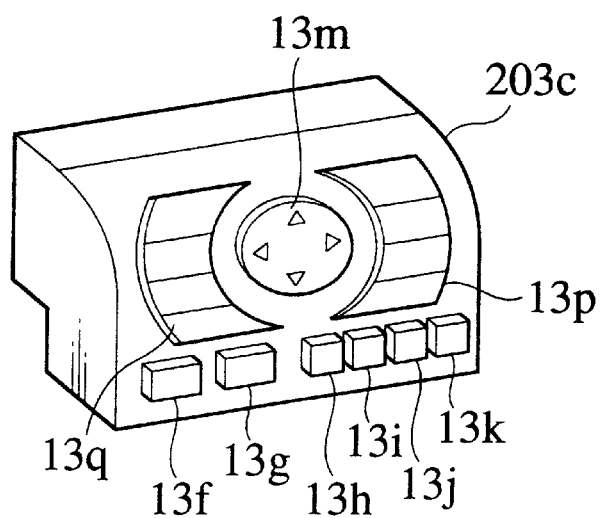
Figure 31:
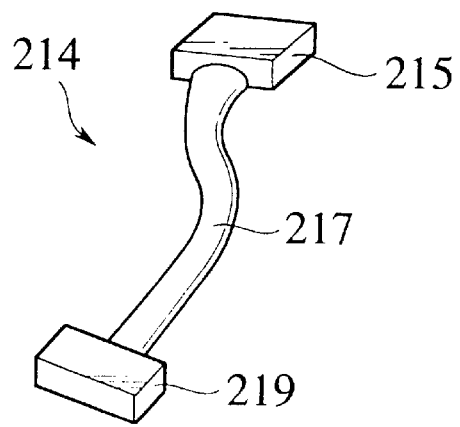
FIG. 31 is an exemplified diagram of an intermediate connector for use in connecting the switch unit with the body unit.

The switch unit is not limited to the specific one illustrated in FIG. 29B. The switch unit may have a different shape depending on the type of a vehicle. The switch unit may be as a switch unit 203b in FIG. 30A or a switch unit 203c in FIG. 30B.

The switch unit 203b has operating switches 13f through 13k, operating switches 13m and 13n having a different configuration and functions, etc. The switch unit 203c has operating switches 13f through 13k, operating switches 13m, 13p, and 13q having a different configuration and functions.

The switch units 203b, 203c, 203d of different shape may share the common body unit 205 by changing the switch units if they are removably attached to the body unit 205 through the connector 213. In other words, the body unit 205 can be used as a common part to reduce the costs for the center cluster module.

While the body unit 205 in FIG. 29C has three equipment connection slits (corresponding to racks 17a through 17c), the body unit 205 may have two or one equipment connection slot(s). When the number of the equipment connection slot is different depending on the type of a vehicle or the like, the switch unit 203 may be commonly used and the body unit 205 may be replaced. Replacing only the body unit 205 for individual vehicles of different type reduces the costs for the center cluster module.

When the switch unit 203 is away from the body unit 205, an intermediate connector 214 as shown in FIG. 28 may be used. The intermediate connector 214 comprises a connector 215, a connector 219 and a cable 217 connecting the connectors.

The connector 215 may be connected to the connector 209 of the switch unit 203 and the connector 219 may be connected to the connector 213 of the body unit 205. The switch unit 203 is then connected to the body unit 205.

Figure 32:
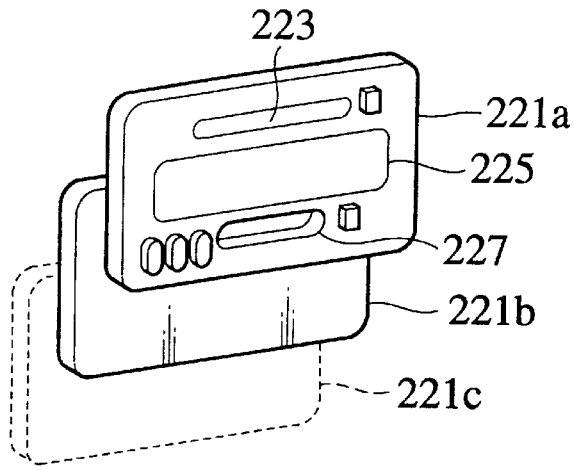
FIG. 32 is an exemplified diagram of a face plate covering over equipment connection slots.

FIG. 32 shows an example of a face plate covering over the equipment connector slots 19. As shown in FIG. 29C, the body unit 205 has the racks 17a through 17c and the equipment connection slot 19 formed therein. FIG. 32 shows first through third face plates 221a through 221c that cover the racks 17a through 17c and the equipment connection slot 19.

The first face plate 221a has openings 223 and 225 formed therein. The openings 223 and 225 are enough in dimension for a CD player (corresponding to the CD 38 in FIG. 5) and a cassette tape player (corresponding to the cassette tape player 37a in FIG. 5) and are formed at the position corresponding to the CD player and the cassette tape player, respectively.

The second face plate 221b has openings (not shown) formed therein having the dimension suitable for a CD player and an MD player. The openings are formed at the position corresponding to the CD player and the MD player, respectively. The third face plate 221c has an opening (not shown) with the dimension suitable for other electrical equipment. The opening is formed at the position corresponding to the electrical equipment to be inserted in.

With the first through third face plates 221a through 221c, one of the first through third face plates 221a through 221c is chosen depending on the type of the electrical equipment installed into the racks 17a through 17c. The selected face plate covers the equipment connection slot 19 and the racks 17a through 17c.

In this way, the face plate can be changed depending on the type of the electrical equipment. The body unit 205 and the switch unit 203 may be used as common parts. Only the face plates are required to be changed depending on the type and/or the grade of a vehicle or to mount an optional part or parts. This reduces the costs for the center cluster module.

Figure 33:
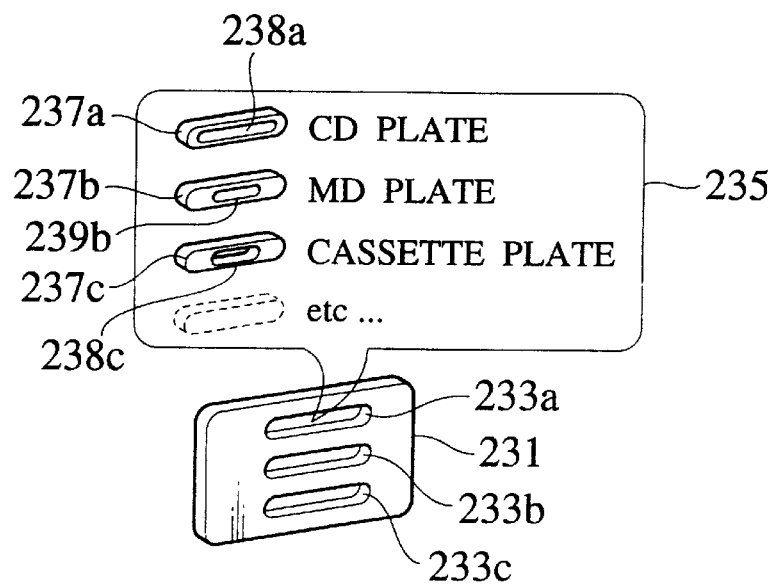
FIG. 33 is a view illustrating another face plate.

The face plate may be configured as in FIG. 33. In the example illustrated in FIG. 33, three openings 233a through 233c are formed in the base plate 231, the number of which is equal to the number of the equipment connection slots 19. A CD plate 237a, an MD plate 237b, and a cassette tape plate 237c are prepared on a plate 235.

The CD plate 237a is provided with an opening 238a for receiving a CD. The MD plate 237b is provided with an opening 238b for receiving an MD. Likewise, the cassette plate 237c is provided with an opening 238c for receiving a cassette tape.

To connect a CD player to the equipment connection slot 19, the CD plate 237a is loaded into the opening 233a. The CD player is connected to the equipment connection slot 19 via the CD plate 237a.

To connect an MD player to the equipment connection slot 19, then the MD plate 237b is loaded into the opening 233b. The MD player is connected to the equipment connection slot 19 via the MD plate 237b. As described above, only the plate is required to be changed depending on the type of the electrical equipment to be installed. This reduces the costs for the center cluster module.

Figure 34:
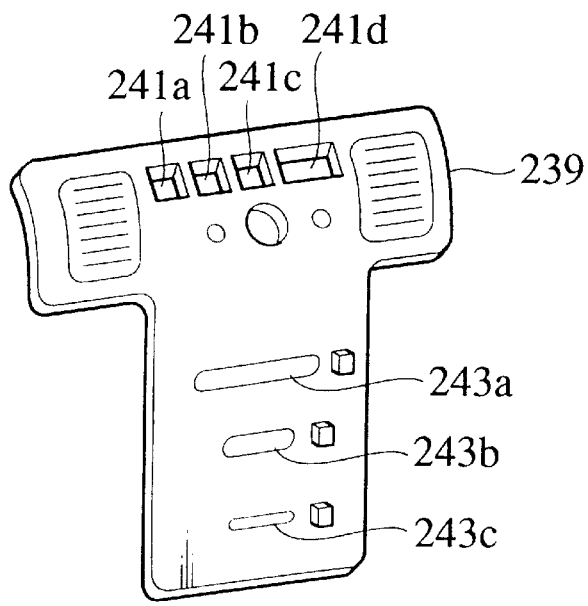
FIG. 34 is an exemplified diagram illustrating the face plate used as a bezel.

The face plate may be configured as in FIG. 34. In the example illustrated in FIG. 34, a bezel 239 that serves as the face plate is for covering the switch unit 203 and the equipment connection slot 19. The bezel 239 is provided with three openings 241a through 241d formed therein for the respective operating switches 13a through 13e. The bezel 239 also comprises three openings 243a through 243c provided therein for the three equipment connection slots to be used depending on the type of the electrical equipment.

The bezel 239 of this type can be changed depending on the type of the electrical equipment, reducing the costs for the center cluster module.

Figure 35:
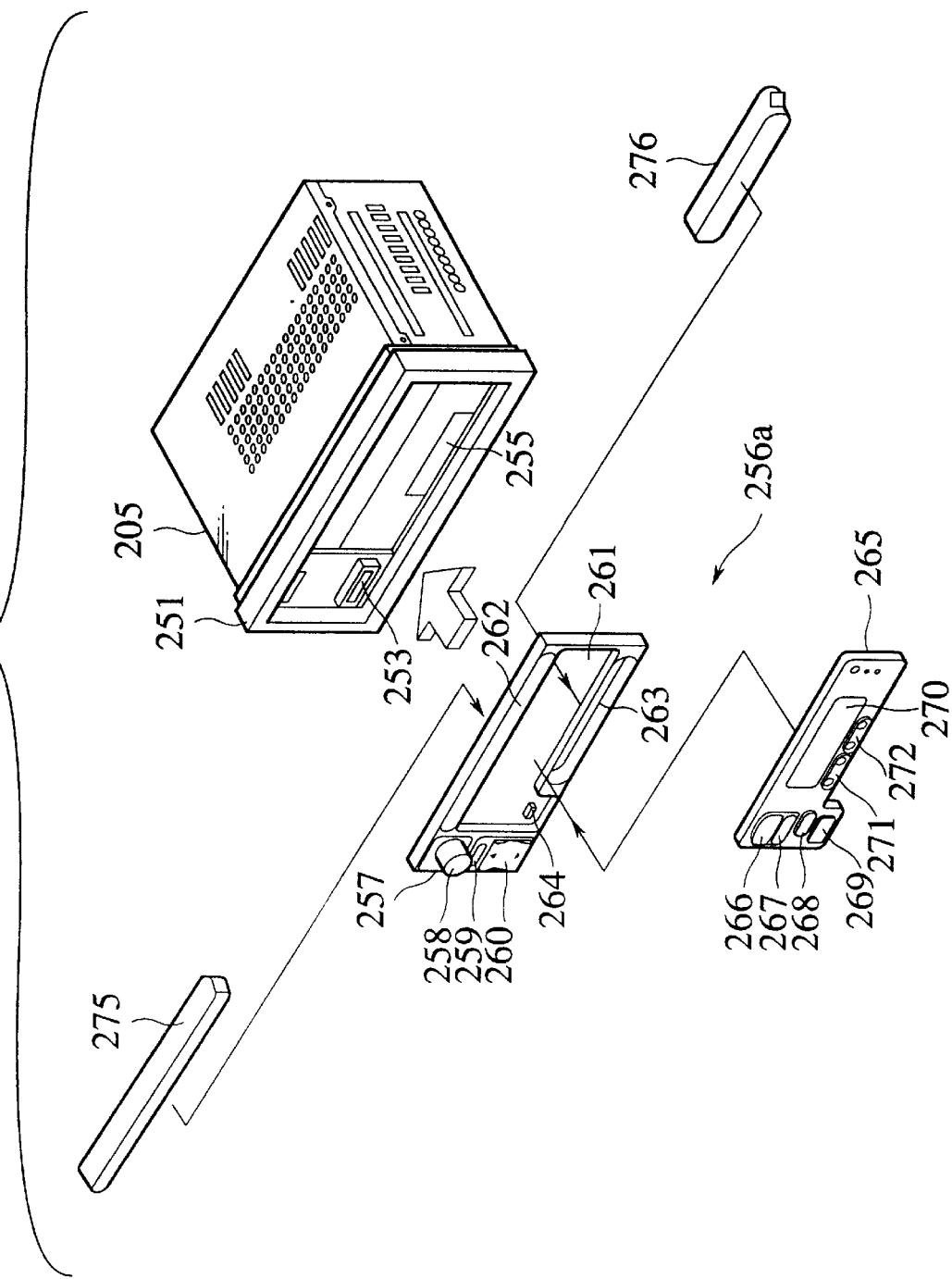
FIG. 35 is a first exemplified configurational diagram of a switch unit that is removably attached to the body unit.

Next, alternative example of the switch unit removably attached to the body unit 205 is described. FIG. 35 shows a first example of the switch unit removably attached to the body unit. The first example of the switch unit shown in FIG. 35 is a case where a radio and a tuner are connected to the body unit 205 as the electrical equipment. The body unit 205 has a front frame 251, a connector 253, and an opening 255 into which the electrical equipment is loaded.

A switch unit 256a can be freely attached to and removed from the front frame 251 of the body unit 205. The switch unit 256a comprises a base face 257, a sub face 265, 35 and plates 275 and 276. The base face 257 can be connected to the body unit 205 through the connector 253. The sub face can be connected to the base face 257 through a connector 264. The plates 275 and 276 are attached to the base face 257.

The base face 257 comprises operating switches 258 through 260 for basic audio/video operations, an opening 261 formed in the base face at a center thereof, an opening 262 formed in the base face above the opening 261, an opening 263 formed therein below the opening 261*m* and a connector 264. The plate 275 formed of a blind cover can be freely inserted into and removed from the opening 262. Likewise, the plate 276 formed of a blind cover can be freely inserted into and removed from the opening 263.

A connector (not shown) is provided at the corresponding position on the base face 257 (near the operating switch 260) opposed to the connector 253 of the body unit 205. This connector is connectable to the connector 253.

The sub face 265 can be freely inserted into and removed from the opening 261 in the base face 257. The sub face 265 comprises operating switches 266 through 268, operating switches 271 and 272, and an opening 270 which a radio and a tuner is inserted into. A connector is provided at the position on the sub face opposed to the connector 264 of the base face 257 (near the operating switch 269), which connector can be connected to the connector 264. The sub face 265 has displays (not shown) corresponding to the operating switches 266 through 268 and operating switches 271 and 272. The sub face 265 is provided depending on the grade and/or features of a network and includes, for example, those for a lower grade, those for a higher grade, those for a navigation purpose, and those for a game.

To connect the radio and the tuner to the body unit 205 of the type described above, the sub face 265 is mounted on the base face 257 and the plate 275 is attached to the opening 262 in the base face 257. The plate 276 is attached to the opening 263 and the base face 257 is connected to the body unit 205 via the connector 253.

Figure 36:
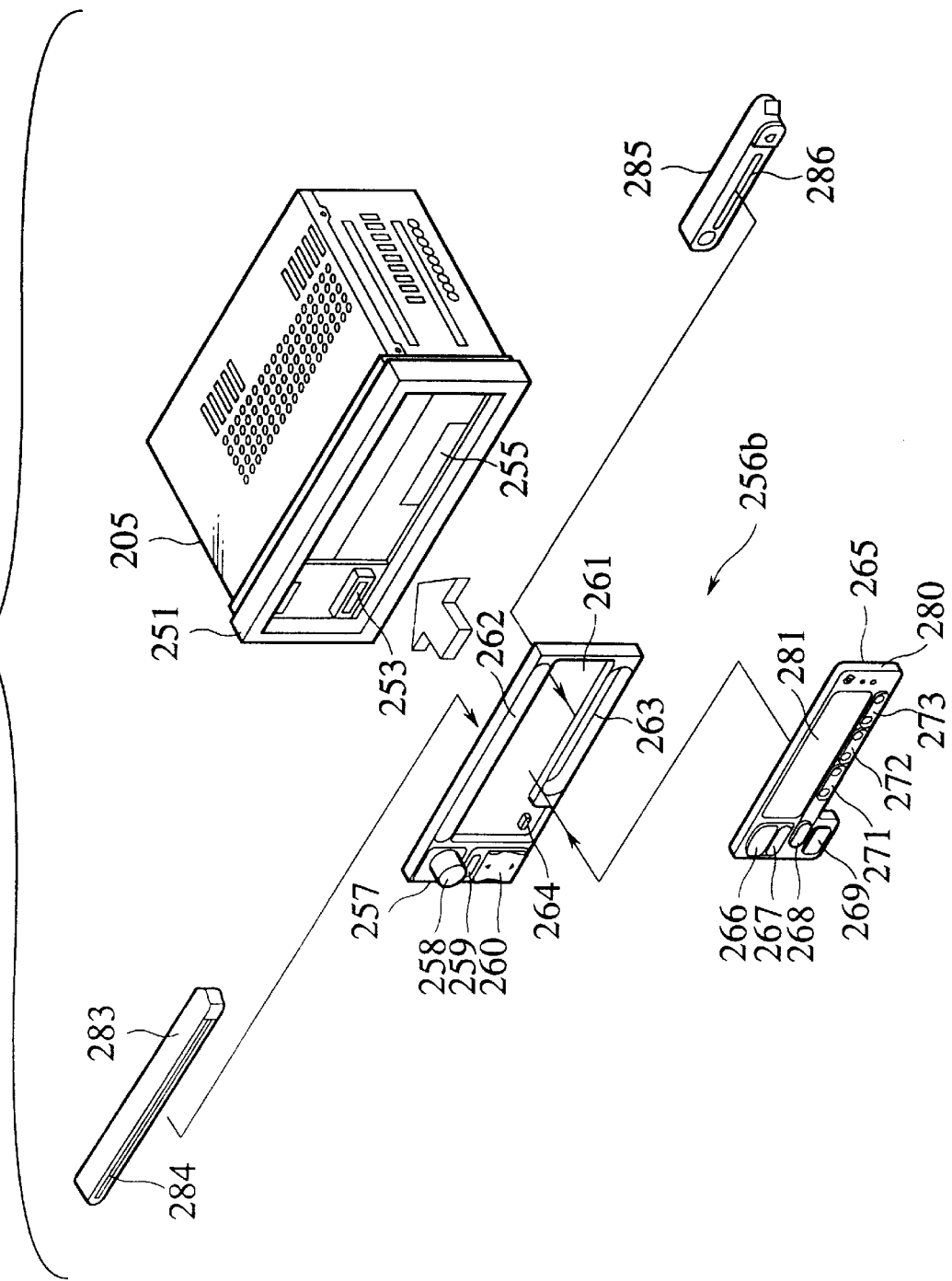
FIG. 36 is a second exemplified configurational diagram of a switch unit that is removably attached to the body unit.

FIG. 36 illustrates a second example of the switch unit that can be freely attached to and removed from the body unit. The second example of the switch unit in FIG. 36 is a case where a CD player, an MD player, and a radio and a tuner are connected to the body unit as the electrical equipment.

The switch unit 256*b* comprises the base face 257, a sub face 280 that can be connected to the base face 257 via the connector 264, and plates 283 and 285 adapted to be attached to the base face 257.

The plate 283 having an opening 284 for a CD is a CD cover and is attached to the opening 262. The plate 285 having an opening 286 for an MD is an MD cover and is attached to the opening 263.

In the sub face 280, the opening 281 is larger than the opening in the sub face 265 in FIG. 35. In addition, the operating switch 273 is added to the components described in conjunction with FIG. 35.

With the above mentioned configuration, in the case that the CD player, the MD player, and the radio and the tuner are connected to the body unit 205, only the sub face 280 and the plates 283 and 285 are required to be replaced and the base face 257 is not required to be replaced. This reduces the costs for the center cluster module.

Figure 37:
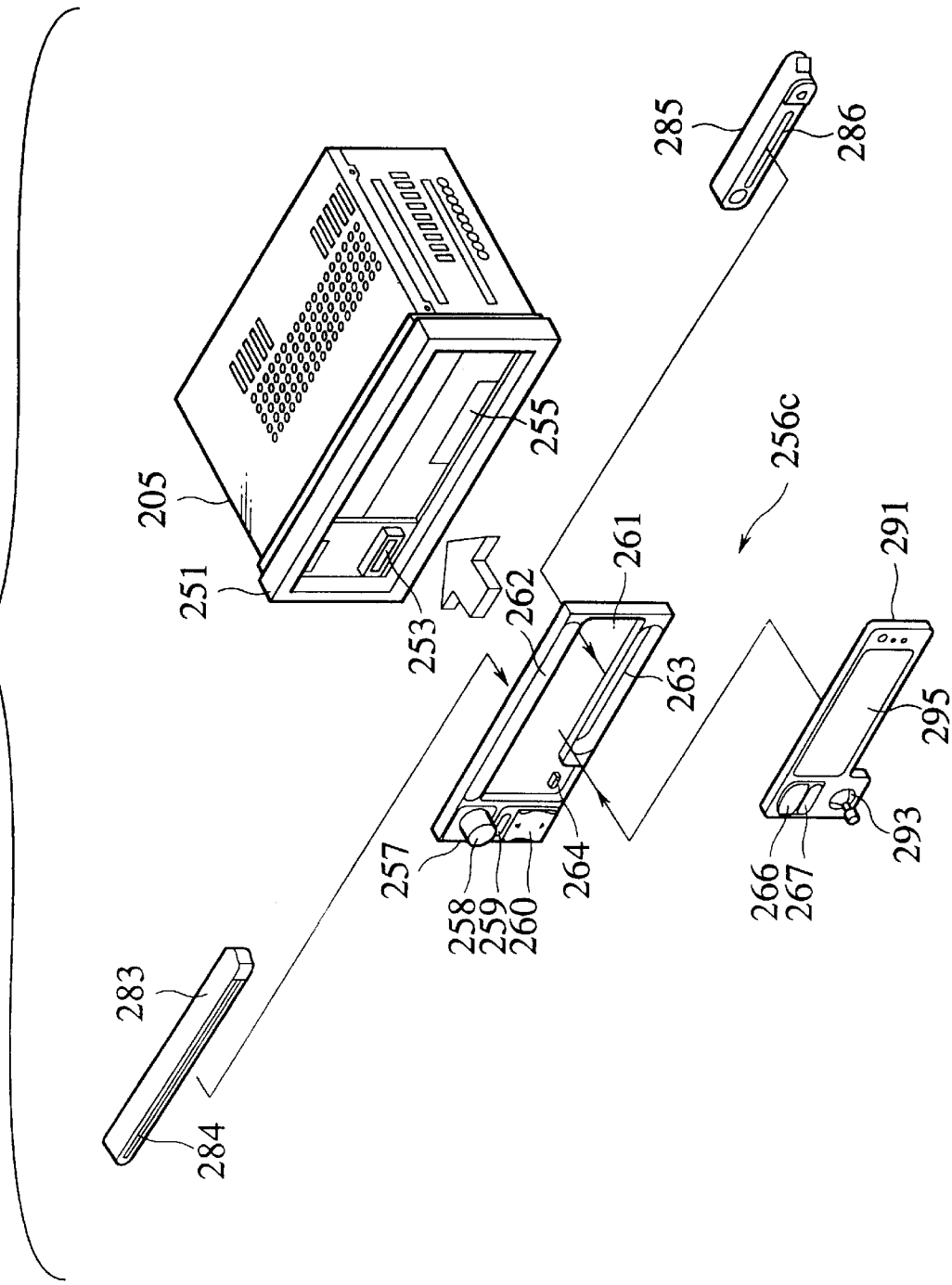
FIG. 37 is a third exemplified configurational diagram of a switch unit that is removably attached to the body unit.

A third example in FIG. 37 is a case where the body unit is connected with, as the electrical equipment, a CD player, an MD player, a navigation system, and a radio and a tuner. The third example in FIG. 37 is different from the second example in FIG. 36 in the configuration of a sub face 291 with a larger opening 295. The third example is substantially equal in effect to the first and second examples.

Figure 38:
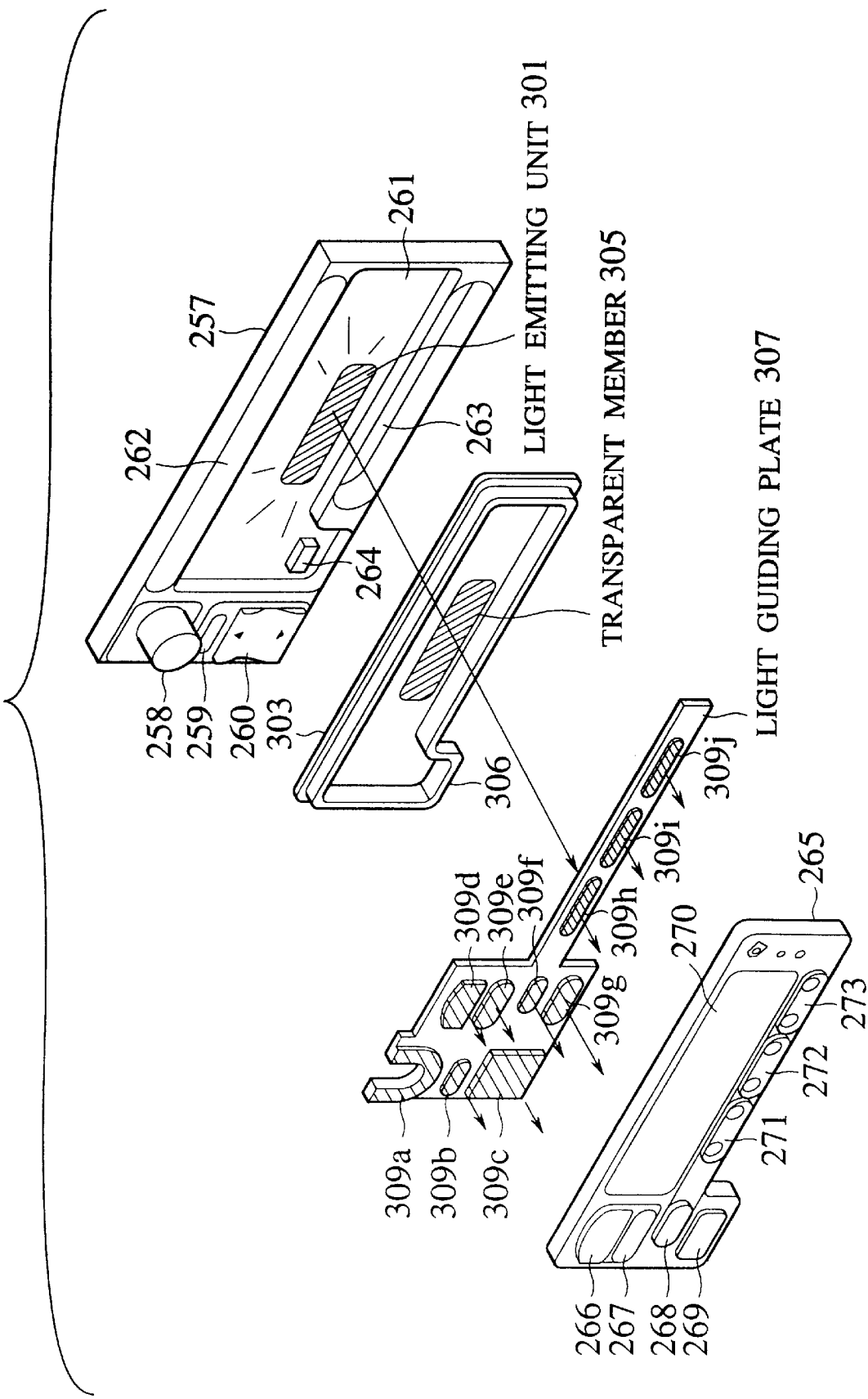
FIG. 38 is a configurational diagram for use in describing illumination of the sub face in a dark environment.

Illumination of the sub face in a dark environment such as during night is described. FIG. 38 shows configuration of illumination for the sub face. In FIG. 38, a light emitting unit 301 such as a light-emitting diode is provided in the opening 261 in the base face 257. A transparent member 305 is provided on a sub face cover 303 to cover the sub face 265 at the position opposed to the light emitting unit 301. The transparent member 305 may be replaced with a translucent member.

A light guiding plate 307 is provided between the sub face cover 303 and the sub face 265. The light guiding plate comprises light guiding elements 309*a* through 309*c* provided at the position opposed to the respective operating switches 258 through 260 of the base face 257, light guiding elements 309*d* through 309*g* provided at the position opposed to the operating switches 266 through 269 of the sub face 260, and light guiding elements 309*h* through 309*j* provided at the position opposed to the operating switches 271 through 273 of the sub face 265.

With the above mentioned configuration, the light beam from the light emitting unit 301 of the base face 257 is passed through the transparent member 305 provided on the sub face cover 303 and is directed to the light guiding plate 307. The incident light passes the light guiding elements 309*a* through 309*j* of the light guiding plate 307. The light beam is then directed to the operating switches 266 through 269, and 271 through 273. Printed portions (not shown) on the operating switches 266 through 269, and 271 through 273 emit lights. The sub face 265 is thus illuminated in a dark environment such as during night.

Figure 39:
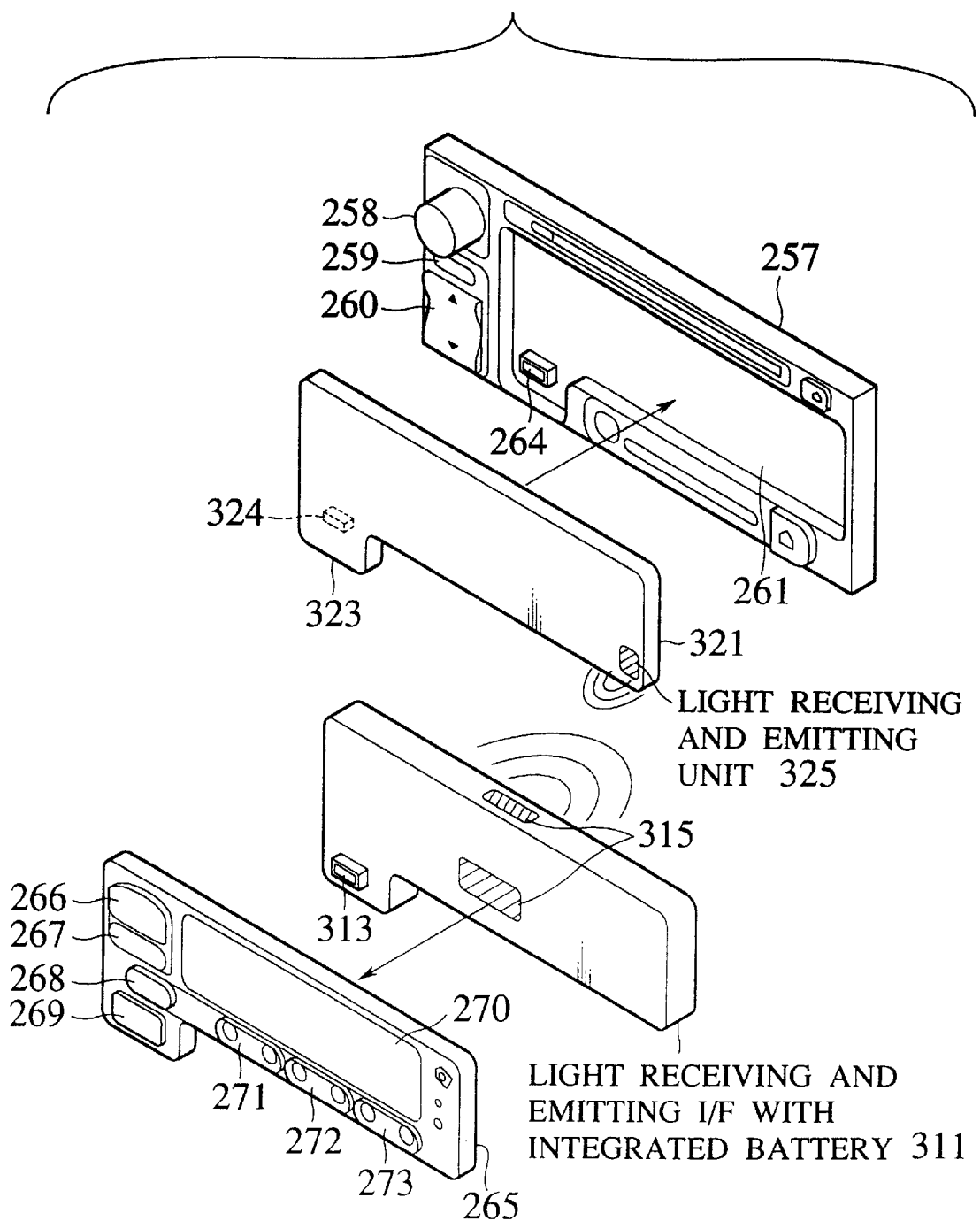
FIG. 39 illustrates a schematic configuration of the base face and the sub face while they are on communication.
Figure 40:
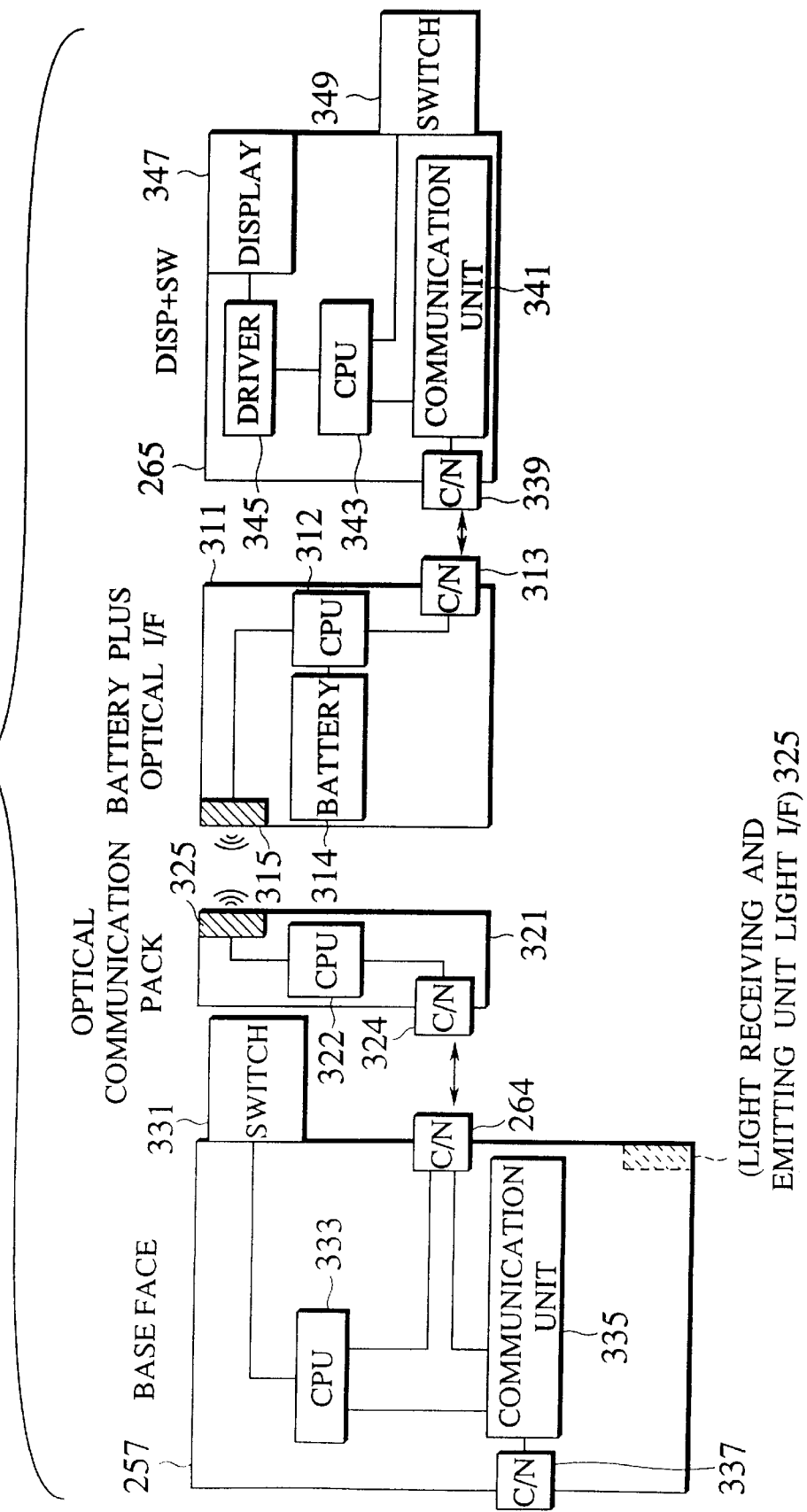
FIG. 40 is a structural block diagram of the base face and the sub face during their communication.

Next, communication between the base face and the sub face is described. FIG. 39 shows a schematic configuration of the base face and the sub face during communication with each other. FIG. 40 shows a structural block diagram of the base face and the sub face during the communication.

The base face 257 comprises connectors 264, 337, a switch 331 (corresponding to the operating switches 258 through 260), a communication unit 335 connected to the connectors 264 and 337, and a central processing unit (CPU) 333 for controlling the individual parts and components.

An optical communication pack 321 comprises a connector 324 to be connected to the connector 264 of the base face 257, a light receiving and emitting unit 325, and a CPU 322 for controlling the individual parts and components.

The light receiving and emitting unit 325 is for receiving a light beam from a battery-integrated light receiving and emitting interface (hereinafter, referred to as a battery-integrated light receiving and emitting I/F) 311 and provides a light beam to the battery-integrated light receiving and emitting I/F 311. The light receiving and emitting 325 may be formed of a light-emitting diode and a light-receiving diode. The optical communication pack 321 is attached onto the base face 257 by means of connecting the connector 324 to the connector 264.

The battery-integrated light receiving and emitting I/F 322 has a connector 313 to be connected to a connector 339 of the sub face 265, a battery 314 for operating the CPU 312, a light receiving and emitting unit 315, and a CPU 312 for controlling the individual components and parts.

The light receiving and emitting unit 315 is for receiving an optical signal from the optical communication pack 321 and for transmitting an optical signal to the optical communication pack 321 by the light emission. For example, the light receiving and emitting unit 315 is formed of a light-emitting diode and a light-receiving diode. The battery-integrated light receiving and emitting I/F 311 is attached onto the sub face 265 by means of connecting the connector 313 to the connector 339.

The sub face 265 comprises the connector 339, a communication unit 341, a display 347, a driver 345 for use in driving the display 347, a switch 349 (corresponding to the operating switches 266 through 269 and 271 through 273), and a CPU 343 for controlling the individual parts and components.

With the above mentioned configuration, the optical communication pack 321 can be attached onto the base face 257 by means of connecting the connector 324 to the connector 264. The battery-integrated light receiving and emitting I/F 311 can be attached onto the sub face 265 by means of connecting the connector 313 to the connector 339.

The light beam from the light receiving and emitting unit 325 of the optical communication pack 321 is received by the light receiving and emitting unit 315 of the battery-integrated light receiving and emitting I/F 311. The signal contained in light beam is then directed to the communication unit 341 of the sub face 265 via the CPU 312 and the connectors 313 and 339.

Therefore, the base face 257 can communicate with the sub face 265. This communication is achieved with a light beam, a remote operation is also available. It is thus possible to establish communication with the portable sub face 265 with the battery-integrated light receiving and emitting I/F 311.

The base face 257 is commonly used and only the sub face 265 is required to be changed in accordance with the type of a vehicle for communication between the base face 257 and the sub face 265. This reduces the costs for the center cluster module.

Figure 41:
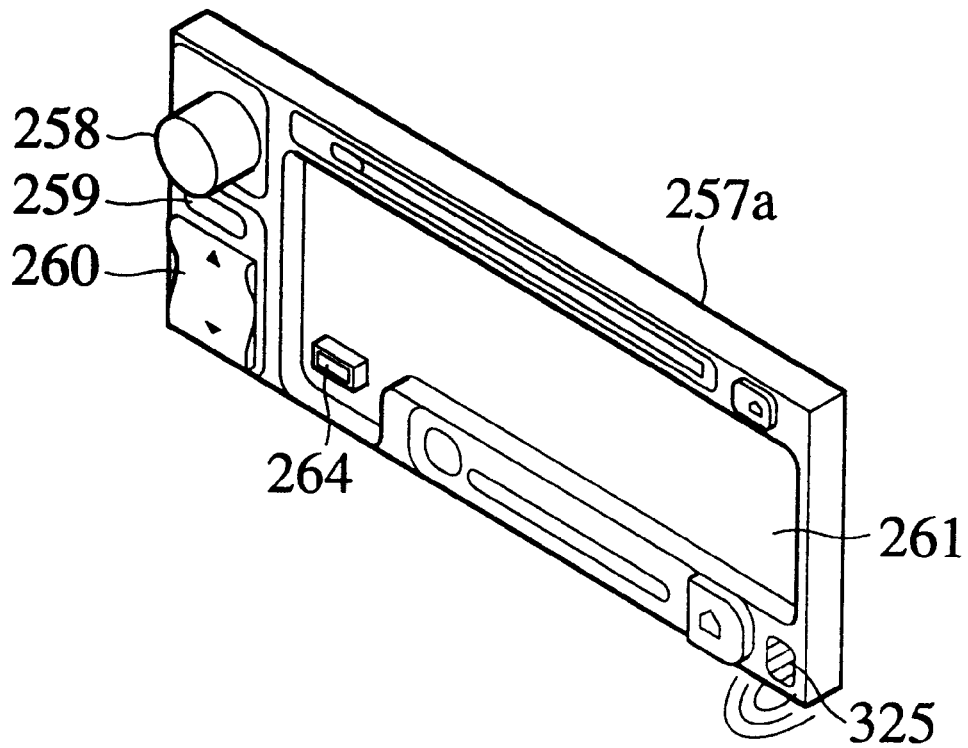
FIG. 41 is a diagram illustrating a base face having a light receiving and emitting unit.

Furthermore, the base face may be a base face 257a with a light receiving and emitting unit 325 as in FIG. 41. In this case, an optional sub face, such as those for gaming, and a battery-integrated light receiving and emitting I/F 311 may further be added to the base face 257a onto which the sub face 265 is attached.

Communication can be established by means of transmitting the light beam from the light receiving and emitting unit 325 of the base face 257a to the light receiving and emitting unit 315 of the battery-integrated light receiving and emitting I/F 311.

The color of the light beam directed may be changed for the case where the sub face 265 is connected to the base face 257 and a case where the base face 257 is communicating with the sub face 265 at a remote position. For example, the light beam may be amber when the base face 257 is connected to the sub face 265 and may be green when they are communicating remotely.

It should be understood that many modifications and adaptations of the invention will become apparent to those skilled in the art and it is intended to encompass such obvious modifications and changes in the scope of the claims appended hereto.

What is claimed is:

1. A center cluster module comprising:

equipment connection slots in and from which multiple pieces of electrical equipment installed in a vehicle are freely installed and removed;

a bus line that is provided at the back of said equipment connection slots to connect the multiple pieces of electrical equipment installed in said equipment connection slots;

a switch unit including multiple operating switches for producing control signals to control corresponding of the multiple pieces of electrical equipment, said operating switches being arranged on an external surface of said switch unit; and a control unit for controlling, through said bus line when one is physically manipulated by a user to control a corresponding piece of electrical equipment, the piece of electrical equipment corresponding to said manipulated operating switch.

2. A center cluster module as claimed in claim 1, further comprising display means for displaying information for each of said multiple pieces of electrical equipment.

3. A center cluster module as claimed in claim 1, wherein said multiple pieces of electrical equipment comprise first electrical equipment of ordinary size and second electrical equipment of half ordinary size, said central cluster further comprising:

multiple first connectors all of the same size that are provided in said equipment connection slots; and a second connector having a first connection unit that connects to each of said multiple first connectors, and a second connection unit and third connection unit that connect to two pieces of the second electrical equipment placed in parallel in the longitudinal dimension of said multiple first connectors; and wherein the first electrical equipment is configured so that it is removably attached to each of said multiple first connectors and two pieces of the second electrical equipment placed in parallel are configured so that it is removably attached to each of said multiple first connectors through said second connector.

4. A center cluster module system comprising:

first equipment connection slots in and from which multiple pieces of electrical equipment installed in a vehicle are freely installed and removed;

a first bus line that is provided at the back of said first equipment connection slots to connect the multiple pieces of electrical equipment installed in said first equipment connection slots;

a switch unit including multiple operating switches for producing control signals to control corresponding of the multiple pieces of electrical equipment, said operating switches being arranged on an external surface of said switch unit;

a first control unit for controlling, through said first bus line when one of the operating switches is physically manipulated by a user to control a corresponding piece of electrical equipment, the piece of electrical equipment corresponding to said manipulated operating switch;

a second bus line connected to the center cluster module; and an expansion module that is connected to said second bus line for communicating with the center cluster module, said expansion module comprising:

second equipment connection slots in and from which additional pieces of electrical equipment are freely installed or removed;

a third bus line that is installed at the back of said second equipment connection slots to mutually connect the additional pieces of electrical equipment installed in said second equipment connection slots; and a second control unit for controlling, through said first and second bus lines when another of the operating switches of said switch unit is manipulated, one of the additional pieces of electrical equipment corresponding to the other manipulated operating switch.

5. A center cluster module system as claimed in claim 4, further comprising:

decision means for deciding whether said first, second, or third bus line is malfunctioning when the multiple pieces of electrical equipment are being operated via said first, second, and third bus lines;

switching means for switching the multiple pieces of electrical equipment to allow stand-alone operation thereof when a malfunction occurs on at least one of said first, second, and third bus lines; and third control means for controlling the standalone operation of the multiple pieces of electrical equipment based on a switching signal supplied from said switching means.

6. An audio equipment connector system comprising:

multiple pieces of audio equipment comprising first audio equipment of ordinary size and second audio equipment of half ordinary size;

equipment connection slots comprising multiple first connectors all of the same size; and a second connector including
 a first connection unit connecting to each of said multiple first connectors, and
 second and a third connection units connecting two pieces of the second audio equipment placed parallel in the longitudinal dimension of said first connector, wherein said first audio equipment is configured so that it is removably attached to each of said multiple first connectors, and two pieces of the second audio equipment placed in parallel are configured so that they are removably attached to each of said first multiple connectors through said second connector.

7. An audio equipment connector system as claimed in claim 6, wherein said second connector is configured to split the signal lines from said first connector, supply signals on one of the split signal lines to the second connection unit, and supply signals on the other split signal lines to the third connection unit.

8. A center cluster module comprising:

a common unit having common parts and elements as well as a connector that are used commonly independent of one of: a type of a vehicle and a grade of the vehicle; and a replaceable unit having parts and elements replaceable for automobiles and other vehicles depending on one of: the type of the vehicle and the grade of the vehicle, the replaceable unit being connected to the common unit via the connector, wherein said replaceable unit is a switch unit having multiple operating switches for producing control signals to control corresponding of the multiple pieces of electrical equipment, said operating switches being arranged on an external surface of said switch unit, and wherein said common unit is a body unit including
 equipment connection slots in and from which the multiple pieces of electrical equipment installed in the vehicle are installed and removed, and
 a control unit for controlling, through the equipment connection slots when the multiple pieces of electrical equipment are loaded in the equipment connection slots and when one of the multiple operating switches of the switch unit is physically manipulated, the piece of electrical equipment corresponding to the manipulated operating switch.

9. A center cluster module as claimed in claim 8, further comprising a face plate that covers over the equipment connection slot, said face plate being replaceable depending on the type of the multiple pieces of electrical equipment installed in the vehicle.

10. A center cluster module as claimed in claim 9, wherein said face plate comprises:

a base plate having multiple first openings, each first opening corresponding to a single equipment connection slot of the equipment connection slots; and a replaceable plate having a second opening into which the electrical equipment to be installed in the vehicle is inserted, said replaceable plate being attached in a corresponding one of the first openings depending on the electrical equipment to be installed.

11. A center cluster module as claimed in claim 9, wherein said face plate is a bezel that covers the switch unit and the equipment connection slot, the bezel being replaceable depending on the type of the multiple pieces of electrical equipment installed in the vehicle.

12. A center cluster module comprising:

a common unit having common parts and elements as well as a connector that are used commonly independent of one of: a type of a vehicle and a grade of the vehicle; and a replaceable unit having parts and elements replaceable for automobiles and other vehicles depending on one of: the type of the vehicle and the grade of the vehicle, the replaceable unit being connected to the common unit via the connector;

wherein said common unit is a switch unit having multiple operating switches for producing control signals to control corresponding of the multiple pieces of electrical equipment, said operating switches being arranged on an external surface of said switch unit, and wherein said replaceable unit is a body unit including
 equipment connection slots in and from which the multiple pieces of electrical equipment installed in the vehicle are freely installed and removed, and
 a control unit for controlling, through the equipment connection slots when the multiple pieces of electrical equipment are loaded in the equipment connection slots and when one of the multiple operating switches of the switch unit is physically manipulated, the piece of electrical equipment corresponding to the manipulated operating switch.

13. A center cluster module as claimed in claim 12, further comprising a face plate that covers over the equipment connection slot, said face plate being replaceable depending on the type of the multiple pieces of electrical equipment installed in the vehicle.

14. A center cluster module as claimed in claim 13, wherein said face plate comprises:

a base plate having multiple first openings, each first opening corresponding to a single equipment connection slot of the equipment connection slots; and a replaceable plate having a second opening into which the electrical equipment to be installed in the vehicle is inserted, said replaceable plate being attached in a corresponding one of the first openings depending on the electrical equipment to be installed.

15. A center cluster module as claimed in claim 13, wherein said face plate is a bezel that covers the switch unit and the equipment connection slot, the bezel being replaceable depending on the type of the multiple pieces of electrical equipment installed in the vehicle.

16. A center cluster module comprising:

a body unit having multiple equipment connection slots in and from which multiple pieces of electrical equipment installed in a vehicle are inserted and removed, and a first connector; and a switch unit having multiple operating switches arranged on an external surface of said switch unit, each of said multiple operating switches producing an operating signal to control a corresponding piece of electrical equipment in response to being physically manipulated by a user, said switch unit being removably attached to said body unit through the first connector, said switch unit including

- a base face having a second connector and multiple first openings, the base face being adapted to be connected to said body unit through the first connector;
- a sub face adapted to be connected to the base face through the second connector, the sub face being replaceable depending on the multiple pieces of electrical equipment connected to the equipment connection slots; and
- a replaceable plate having a second opening to receive one of the multiple pieces of electrical equipment installed in the vehicle, the replaceable plate being attached in a corresponding one of the first openings depending on the multiple pieces of electrical equipment connected to the equipment connection slots.

17. A center cluster module as claimed in claim 16, further comprising:

a light emitting unit provided on said base face; and a light guiding member provided between said base face and said sub face to guide a light beam from said light emitting unit to the operating switches of said sub face.

18. A center cluster module as claimed in claim 16, further comprising:

a first optical communication unit having a first light receiving and emitting unit for receiving and emitting a light beam, said first optical communication unit being removably attached to said base face; and a second optical communication unit having a second light receiving and emitting unit for optical communication with the first light receiving and emitting unit, and a battery for use in operating the second light receiving and emitting unit, said second optical communication unit being removably attached to said sub face.

19. A center cluster module as claimed in claim 16, wherein said base face is provided with a first light receiving and emitting unit for receiving and emitting a light beam and said sub face is provided with a removable optical communication unit having a second light receiving and emitting unit for communicating with the first light receiving and emitting unit, and a battery for operating the second light receiving and emitting unit.

* * * * *